United States Patent
Rothschilds et al.

(10) Patent No.: US 10,614,033 B1
(45) Date of Patent: Apr. 7, 2020

(54) CLIENT AWARE PRE-FETCH POLICY SCORING SYSTEM

(71) Applicant: Qumulo, Inc., Seattle, WA (US)

(72) Inventors: Thomas Gregory Rothschilds, Seattle, WA (US); Thomas R. Unger, Seattle, WA (US); Eric E. Youngblut, Seattle, WA (US); Peter J. Godman, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/262,790

(22) Filed: Jan. 30, 2019

(51) Int. Cl.
*G06F 16/00* (2019.01)
*G06F 16/172* (2019.01)
*G06F 16/182* (2019.01)

(52) U.S. Cl.
CPC .......... *G06F 16/172* (2019.01); *G06F 16/182* (2019.01)

(58) Field of Classification Search
CPC combination set(s) only.
See application file for complete search history.

(56) References Cited

U.S. PATENT DOCUMENTS

| | | |
|---|---|---|
| 5,165,031 A | 11/1992 | Pruul et al. |
| 5,319,773 A | 6/1994 | Britton et al. |
| 5,410,684 A | 4/1995 | Ainsworth et al. |
| 5,953,719 A | 9/1999 | Kleewein et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 * | 3/2003 | Yochai ............... G06F 12/0862 711/137 |
| 6,772,735 B2 | 8/2004 | Thexton et al. |
| 6,874,130 B1 | 3/2005 | Baweja et al. |
| 6,892,211 B2 | 5/2005 | Hitz et al. |

(Continued)

FOREIGN PATENT DOCUMENTS

| | | |
|---|---|---|
| EP | 1498829 A1 | 1/2005 |
| WO | WO0072201 A1 | 11/2000 |

OTHER PUBLICATIONS

Office Communication for U.S. Appl. No. 15/967,499 dated Jun. 27, 2018.

(Continued)

*Primary Examiner* — Augustine K. Obisesan
(74) *Attorney, Agent, or Firm* — John W. Branch; Lowe Graham Jones PLLC

(57) ABSTRACT

Embodiments are directed to managing data in a file system. A pre-fetch engine may receive requests from a client the file system that includes a pre-fetch storage tier and a file storage tier of storage devices. The pre-fetch engine determines a pre-fetch policy based on the requests such that the pre-fetch policy determines which blocks to copy to the pre-fetch storage tier. And, the pre-fetch policy may be associated with a score model that includes score rules where one of the rules may be associated with a client score. The pre-fetch engine may obtain scores associated with the score rules such that the scores are based on previous requests made by the client. In response to scores exceeding a threshold value, the pre-fetch engine may copy the blocks to the pre-fetch storage tier. The pre-fetch engine may update the scores based on the performance of the pre-fetch policy.

28 Claims, 10 Drawing Sheets

(56) References Cited

U.S. PATENT DOCUMENTS

| | | |
|---|---|---|
| 6,965,903 B1 | 11/2005 | Agarwal et al. |
| 7,213,040 B1 | 5/2007 | Stokes et al. |
| 7,636,743 B2 | 12/2009 | Erofeev |
| 7,693,876 B2 | 4/2010 | Hackworth et al. |
| 7,644,580 B2 | 11/2010 | Srivastava et al. |
| 7,937,421 B2 | 5/2011 | Mikesell et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,364,648 B1 | 1/2013 | Sim-Tang |
| 8,448,170 B2 | 5/2013 | Wipfel et al. |
| 8,463,825 B1 | 6/2013 | Harty et al. |
| 8,515,911 B1 | 8/2013 | Zhou et al. |
| 8,612,404 B2 | 12/2013 | Bone et al. |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,868,797 B1 | 10/2014 | Kirac et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,047,017 B1 | 6/2015 | Dolan et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,501,487 B1 | 11/2016 | Yuan et al. |
| 9,547,560 B1 | 1/2017 | Lee |
| 9,753,782 B2 | 9/2017 | Fang et al. |
| 9,753,932 B1 | 9/2017 | Brow et al. |
| 9,785,377 B2 | 10/2017 | Shin et al. |
| 10,140,185 B1 | 11/2018 | Lopez et al. |
| 10,318,401 B2 | 6/2019 | Rothschilds et al. |
| 2001/0039622 A1 | 11/2001 | Hitz et al. |
| 2002/0083073 A1 | 6/2002 | Vaidya et al. |
| 2002/0099691 A1 | 7/2002 | Lore et al. |
| 2003/0033308 A1 | 2/2003 | Patel et al. |
| 2003/0182313 A1 | 9/2003 | Federwisch et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0091663 A1 | 4/2005 | Bagsby |
| 2005/0119996 A1 | 6/2005 | Ohata et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0123005 A1 | 6/2006 | Burnett et al. |
| 2006/0271604 A1 | 11/2006 | Shoens |
| 2007/0027985 A1 | 2/2007 | Ramany et al. |
| 2007/0100655 A1 | 5/2007 | Kohl |
| 2007/0118561 A1 | 5/2007 | Idicula et al. |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0172366 A1 | 7/2008 | Hannel et al. |
| 2008/0228772 A1 | 9/2008 | Plamondon |
| 2008/0256474 A1 | 10/2008 | Chakra et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0222509 A1 | 9/2009 | King et al. |
| 2009/0274047 A1 | 11/2009 | Kruys et al. |
| 2010/0036895 A1 | 2/2010 | Boyd et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 8/2010 | Susanto et al. |
| 2010/0287512 A1 | 11/2010 | Gan et al. |
| 2011/0039622 A1 | 2/2011 | Levenson |
| 2011/0066668 A1 | 3/2011 | Guarraci |
| 2011/0125799 A1 | 5/2011 | Kandasamy et al. |
| 2011/0125973 A1 | 5/2011 | Lev et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0166478 A1 | 6/2012 | Das et al. |
| 2012/0317079 A1 | 12/2012 | Shoens et al. |
| 2013/0191355 A1 | 7/2013 | Bone et al. |
| 2013/0227236 A1 | 8/2013 | Flynn et al. |
| 2013/0311454 A1 | 11/2013 | Ezzat |
| 2013/0318194 A1 | 11/2013 | Timbs |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0101389 A1* | 4/2014 | Nellans ............... G06F 12/0862 711/137 |
| 2014/0156956 A1 | 6/2014 | Ezra |
| 2014/0181441 A1 | 6/2014 | Kottomtharayil et al. |
| 2014/0258609 A1 | 9/2014 | Cui et al. |
| 2014/0280485 A1* | 9/2014 | A Hummaida ..... H04L 67/1097 709/203 |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1* | 12/2014 | Merry ................... G06F 9/54 719/328 |
| 2015/0067086 A1 | 3/2015 | Adriaens et al. |
| 2015/0067142 A1 | 3/2015 | Renkema |
| 2015/0135331 A1 | 5/2015 | Das |
| 2015/0193347 A1* | 7/2015 | Kluesing ............. G06F 12/0862 711/137 |
| 2015/0215405 A1 | 7/2015 | Back et al. |
| 2015/0234879 A1 | 8/2015 | Baldwin et al. |
| 2015/0242263 A1 | 8/2015 | Klose |
| 2015/0278282 A1 | 10/2015 | Sardina et al. |
| 2016/0034356 A1 | 2/2016 | Aron et al. |
| 2016/0139836 A1 | 5/2016 | Nallathambi et al. |
| 2016/0224430 A1 | 8/2016 | Long et al. |
| 2016/0246816 A1 | 8/2016 | Abiri et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1* | 12/2016 | Hooker ............... G06F 9/30047 |
| 2016/0359859 A1 | 12/2016 | Capone |
| 2016/0380878 A1 | 12/2016 | Bugenhagen et al. |
| 2017/0046143 A1 | 2/2017 | Kochhar et al. |
| 2017/0091046 A1 | 3/2017 | Bangalore et al. |
| 2017/0163728 A1 | 6/2017 | Chawla et al. |
| 2017/0201582 A1 | 7/2017 | Zhang et al. |
| 2017/0286455 A1 | 10/2017 | Li et al. |
| 2017/0316321 A1 | 11/2017 | Whitney et al. |
| 2018/0040029 A1* | 2/2018 | Zeng ................. G06Q 30/0269 |
| 2018/0288057 A1 | 10/2018 | Varadamma et al. |
| 2018/0314423 A1 | 11/2018 | Gong et al. |
| 2019/0095112 A1 | 3/2019 | Lingarajappa |

OTHER PUBLICATIONS

Office Communication for U.S. Appl. No. 16/226,587 dated Feb. 25, 2019.

Office Communication for U.S. Appl. No. 15/473,051 dated Jun. 30, 2017.

Office Communication for U.S. Appl. No. 16/004,182 dated Mar. 5, 2019.

Office Communication for U.S. Appl. No. 16/004,182 dated Aug. 23, 2018.

Office Communication for U.S. Appl. No. 16/004,208 dated Aug. 27, 2018.

European Communication and European Search Report for European Application No. 18155779.4, dated Apr. 17, 2018.

(56) References Cited

OTHER PUBLICATIONS

Office Communication for U.S. Appl. No. 16/262,756 dated Aug. 5, 2019.
Office Communication for U.S. Appl. No. 16/262,756 dated Apr. 2, 2019.
Office Communication for U.S. Appl. No. 16/262,756 dated Oct. 25, 2019.
Office Communication for U.S. Appl. No. 16/659,488 dated Dec. 30, 2019.
Office Communication for U.S. Appl. No. 14/595,598 dated Dec. 31, 2019.
Office Communication for U.S. Appl. No. 16/228,716 dated Jun. 24, 2019.
Office Communication for U.S. Appl. No. 16/231,354 dated Jul. 10, 2019.
Office Communication for U.S. Appl. No. 16/226,587 dated Aug. 5, 2019.
Office Communication for U.S. Appl. No. 16/228,716 dated Feb. 28, 2019.
Office Communication for U.S. Appl. No. 16/231,354 dated Mar. 25, 2019.
Office Communication for U.S. Appl. No. 16/262,790 dated Aug. 23, 2019.
Office Communication for U.S. Appl. No. 16/262,790 dated Apr. 18, 2019.
Office Communication for U.S. Appl. No. 16/234,395 dated Aug. 8, 2019.
Office Communication for U.S. Appl. No. 16/234,334 dated Apr. 5, 2019.
Office Communication for U.S. Appl. No. 16/234,395 dated Mar. 28, 2019.
Office Communication for U.S. Appl. No. 16/234,334 dated Oct. 11, 2019.
Official Communication for U.S. Appl. No. 15/473,051 dated Jun. 30, 2017.
European Communication and European Search Report for European Application No. 18155779.4.
Official Communication for U.S. Appl. No. 15/694,604 dated Jun. 3, 2019.
Official Communication for U.S. Appl. No. 16/004,182 dated Aug. 23, 2018.
Official Communication for U.S. Appl. No. 16/004,182 dated Mar. 5, 2019.
Official Communication for U.S. Appl. No. 16/004,182 dated Jul. 3, 2019.
Official Communication for U.S. Appl. No. 16/004,182 dated May 22, 2019.
Official Communication for U.S. Appl. No. 16/004,182 dated Jan. 7, 2020.
Official Communication for U.S. Appl. No. 14/595,043 dated May 4, 2017.
Official Communication for U.S. Appl. No. 14/595,043 dated Feb. 23, 2018.
Official Communication for U.S. Appl. No. 14/595,043 dated May 25, 2018.
Official Communication for U.S. Appl. No. 14/595,043 dated Oct. 5, 2018.
Official Communication for U.S. Appl. No. 14/595,043 dated Jun. 7, 2019.
Official Communication for U.S. Appl. No. 14/595,043 dated Aug. 27. 2019.
Official Communication for U.S. Appl. No. 14/658,015 dated Apr. 27, 2017.
Official Communication for U.S. Appl. No. 14/658,015 dated Jan. 4, 2018.
Official Communication for U.S. Appl. No. 14/658,015 dated Jul. 13, 2018.
Official Communication for U.S. Appl. No. 14/859,061 dated Sep. 22, 2017.
Official Communication for U.S. Appl. No. 15/831,236 dated Mar. 30, 2018.
Official Communication for U.S. Appl. No. 15/831,236 dated Aug. 15, 2018.
Official Communication for U.S. Appl. No. 14/859,114 dated Jul. 24, 2017.
Official Communication for U.S. Appl. No. 14/859,114 dated Feb. 21, 2018.
Official Communication for U.S. Appl. No. 14/859,114 dated May 11, 2018.
Communication for U.S. Appl. No. 15/694,604 dated Nov. 20, 2019.
Office Communication for U.S. Appl. No. 14/859,114 dated Jun. 27, 2018.
Communication for U.S. Appl. No. 14/859,114 dated Nov. 19, 2018.
Office Communication for U.S. Appl. No. 14/859,114 dated Jan. 31, 2019.
Communication for U.S. Appl. No. 14/859,114 dated Mar. 7, 2019.
Communication for U.S. Appl. No. 14/859,114 dated Sep. 13, 2019.
Office Communication for U.S. Appl. No. 14/859,114 dated Nov. 26, 2019.
Office Communication for U.S. Appl. No. 15/288,853 dated Sep. 19, 2018.
Office Communication for U.S. Appl. No. 15/288,853 dated Mar. 25, 2019.
Communication for U.S. Appl. No. 16/436,825 dated Jul. 11, 2019.
Communication for U.S. Appl. No. 15/474,047 dated Sep. 18, 2017.
Office Communication for U.S. Appl. No. 15/474,047 dated Mar. 9, 2018.
Communication for U.S. Appl. No. 15/474,047 dated Jun. 11, 2018.
Communication for U.S. Appl. No. 15/474,047 dated Aug. 15, 2018.
Communication for U.S. Appl. No. 15/957,809 dated Jun. 28, 2018.
Communication for U.S. Appl. No. 15/957,809 dated Jan. 24, 2019.
Communication for U.S. Appl. No. 16/434,157 dated Jul. 25, 2019.
Communication for U.S. Appl. No. 15/854,447 dated May 6, 2019.
Office Communication for U.S. Appl. No. 16/505,562 dated Aug. 30, 2019.
European Communication and European Search Report for European Application No. 17206518.7 dated Apr. 5, 2018.
Office Communication for U.S. Appl. No. 16/125,573 dated Nov. 21, 2019.
Office Communication for U.S. Appl. No. 16/226,587 dated Oct. 24, 2019
Office Communication for U.S. Appl. No. 15/967,499 dated Jun. 27, 2018, pp. 1-25.
Office Communication for U.S. Appl. No. 16/226,587 dated Feb. 25, 2019, pp. 1-65.
Office Communication for U.S. Appl. No. 15/473,051 dated Jun. 30, 2017, pp. 1-22.
Office Communication for U.S. Appl. No. 16/004,182 dated Mar. 5, 2019, pp. 1-46.
Office Communication for U.S. Appl. No. 16/004,182 dated Aug. 23, 2018, pp. 1-46.
Office Communication for U.S. Appl. No. 16/004,208 dated Aug. 27, 2018, pp. 1-11.
European Communication and European Search Report for European Application No. 18155779.4, dated Apr. 17, 2018, pp. 1-15.
Office Communication for U.S. Appl. No. 16/262,756 dated Aug. 5, 2019, pp. 1-48.
Office Communication for U.S. Appl. No. 16/262,756 dated Apr. 2, 2019, pp. 1-40.
Office Communication for U.S. Appl. No. 16/262,756 dated Oct. 25, 2019, pp. 1-6.
Office Communication for U.S. Appl. No. 16/659,488 dated Dec. 30, 2019, pp. 1-35.
Office Communication for U.S. Appl. No. 14/595,598 dated Dec. 31, 2019, pp. 1-23.
Office Communication for U.S. Appl. No. 16/228,716 dated Jun. 24, 2019, pp. 1-28.
Office Communication for U.S. Appl. No. 16/231,354 dated Jul. 10, 2019, pp. 1-19.
Office Communication for U.S. Appl. No. 16/226,587 dated Aug. 5, 2019, pp. 1-55.

(56) References Cited

OTHER PUBLICATIONS

Office Communication for U.S. Appl. No. 16/228,716 dated Feb. 28, 2019, pp. 1-27.
Office Communication for U.S. Appl. No. 16/231,354 dated Mar. 25, 2019, pp. 1-19.
Office Communication for U.S. Appl. No. 16/262,790 dated Aug. 23, 2019, pp. 1-20.
Office Communication for U.S. Appl. No. 16/262,790 dated Apr. 18, 2019, pp. 1-24.
Office Communication for U.S. Appl. No. 16/234,395 dated Aug. 8, 2019, pp. 1-28.
Office Communication for U.S. Appl. No. 16/234,334 dated Apr. 5, 2019, pp. 1-24.
Office Communication for U.S. Appl. No. 16/234,395 dated Mar. 28, 2019, pp. 1-36.
Kappes et al, "Virtualization-aware Access Control for Multitenant Fiiesystems", University of Ioannina, Greece, Technical Report No. DCS2013-1, 8, 61-64. (Year: 2013), pp. 1-6.
Hitz et al. "Merging NT and UNIX filesystem permissions", In Proceedings of the 2nd conference on USENIX Windows NT Symposium-vol. 2 (pp. 10-10). USENIX Association. (Year: Aug. 1998), pp. 1-10.
Office Communication for U.S. Appl. No. 16/234,334 dated Oct. 11, 2019, pp. 1-22.
Official Communication for U.S. Appl. 15/473,051 dated Jun. 30, 2017, pp. 1-23.
Official Communication for U.S. Appl. No. 15/694,604 dated Jun. 3, 2019, pp. 1-14.
Official Communication for U.S. Appl. No. 16/004,182 dated Aug. 23, 2018, pp. 1-46.
Official Communication for U.S. Appl. No. 16/004,182 dated Mar. 5, 2019, pp. 1-46.
Official Communication for U.S. Appl. No. 16/004,182 dated Jul. 3, 2019, pp. 1-50.
Official Communication for U.S. Appl. No. 16/004,182 dated May 22, 2019, pp. 1-6.
Official Communication for U.S. Appl. No. 16/004,182 dated Jan. 7, 2020, pp. 1-54.
Official Communication for U.S. Appl. No. 14/595,043 dated May 4, 2017, pp. 1-38.
Official Communication for U.S. Appl. No. 14/595,043 dated Feb. 23, 2018, pp. 1-22.
Official Communication for U.S. Appl. No. 14/595,043 dated May 25, 2018, pp. 1-14.
Official Communication for U.S. Appl. No. 14/595,043 dated Oct. 5, 2018, pp. 1-26.
Official Communication for U.S. Appl. No. 14/595,043 dated Jun. 7, 2019, pp. 1-29.
Official Communication for U.S. Appl. No. 14/595,043 dated Aug. 27, 2019, pp. 1-34.
Official Communication for U.S. Appl. No. 14/658,015 dated Apr. 27, 2017, pp. 1-8.
Official Communication for U.S. Appl. No. 14/658,015 dated Jan. 4, 2018, pp. 1-35.
Official Communication for U.S. Appl. No. 14/658,015 dated Jul. 13, 2018, pp. 1-18.
Official Communication for U.S. Appl. No. 14/859,061 dated Sep. 22, 2017, pp. 1-29.
Official Communication for U.S. Appl. No. 15/831,236 dated Mar. 30, 2018, pp. 1-8.
Official Communication for U.S. Appl. No. 15/831,236 dated Aug. 15, 2018, pp. 1-27.
Official Communication for U.S. Appl. No. 14/659,114 dated Jul. 24, 2017, pp. 1-165.
Official Communication for U.S. Appl. No. 14/859,114 dated Feb. 21, 2018, pp. 1-27.
Official Communication for U.S. Appl. No. 14/859,114 dated May 11, 2018, pp. 1-7.
Office Communication for U.S. Appl. No. 15/694,604 dated Nov. 20, 2019, pp. 1-24.
Office Communication for U.S. Appl. No. 14/659,114 dated Jun. 27, 2016, pp. 1-40.
Office Communication for U.S. Appl. No. 14/859,114 dated Nov. 19, 2018, pp. 1-41.
Office Communication for U.S. Appl. No. 14/859,114 dated Jan. 31, 2019, pp. 1-5.
Office Communication for U.S. Appl. No. 14/859,114 dated Mar. 7, 2019, pp. 1-39.
Office Communication for U.S. Appl. No. 14/859,114 dated Sep. 13, 2019, pp. 1-8.
Office Communication for U.S. Appl. No. 14/859,114 dated Nov. 26, 2019, pp. 1-43.
Office Communication for U.S. Appl. No. 15/288,853 dated Sep. 19, 2018, pp. 1-27.
Chimera, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-25.
Cudre-Mauroux, et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-22.
Office Communication for U.S. Appl. No. 15/474,047 dated Sep. 18, 2017, p. 1-24.
Office Communication for U.S. Appl. No. 15/474,047 dated Mar. 9, 2018, pp. 1-12.
Office Communication for U.S. Appl. No. 15/474,047 dated Jun. 11, 2018, pp. 1-7.
Office Communication for U.S. Appl. No. 15/474,047 dated Aug. 15, 2018, pp. 1-24.
Office Communication for U.S. Appl. No. 15/957,809 dated Jun. 28, 2018, pp. 1-42.
Office Communication for U.S. Appl. No. 15/957,809 dated Jan. 24, 2019, pp. 1-24.
Office Communication for U.S. Appl. No. 16/434,157 dated Jul. 25, 2019, pp. 1-16.
Office Communication for U.S. Appl. No. 15/854,447 dated May 6, 2019, pp. 1-31.
Office Communication for U.S. Appl. No. 16/505,562 dated Aug. 30, 2019, pp. 1-46.
European Communication and European Search Report for European Application No. 17206518.7 dated Apr. 5, 2018, pp. 1-8.
Karatza et al. Epoch load sharing in a network of workstations, Simulation Symposium, 2001. Proceedings. 34TH Annual Apr. 22-26, 2001, Piscataway, NJ, USA, IEEE, Apr. 22, 2001 (Apr. 22, 2001), pp. 36-42, XP010541274, ISBN: 978-0/7695-1092-7.
Office Communication for U.S. Appl. No. 16/125,573 dated Nov. 21, 2019, pp. 1-24.
Office Communication for U.S. Appl. No. 16/226,587 dated Oct. 24, 2019, pp. 1-6.
Office Communication for U.S. Appl. No. 16/234,334 dated Jan. 16, 2020, pp. 1-8.

\* cited by examiner

US 10,614,033 B1

CLIENT AWARE PRE-FETCH POLICY SCORING SYSTEM

TECHNICAL FIELD

The present invention relates generally to file systems, and more particularly, but not exclusively, to managing pre-fetching in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Conventionally, some distributed file systems implement various pre-fetching schemes to help improve read performance. However, implementing a pre-fetch policy that consistently or predictably improves read performance may be difficult because of the variability of client read patterns. Also, a per-request pre-fetch policy scoring that enables a file system to determine if pre-fetching should be executed may be challenging to implement at scale because of vast number of file system requests that must be handled. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF THE VARIOUS EMBODIMENTS

Figure 1:
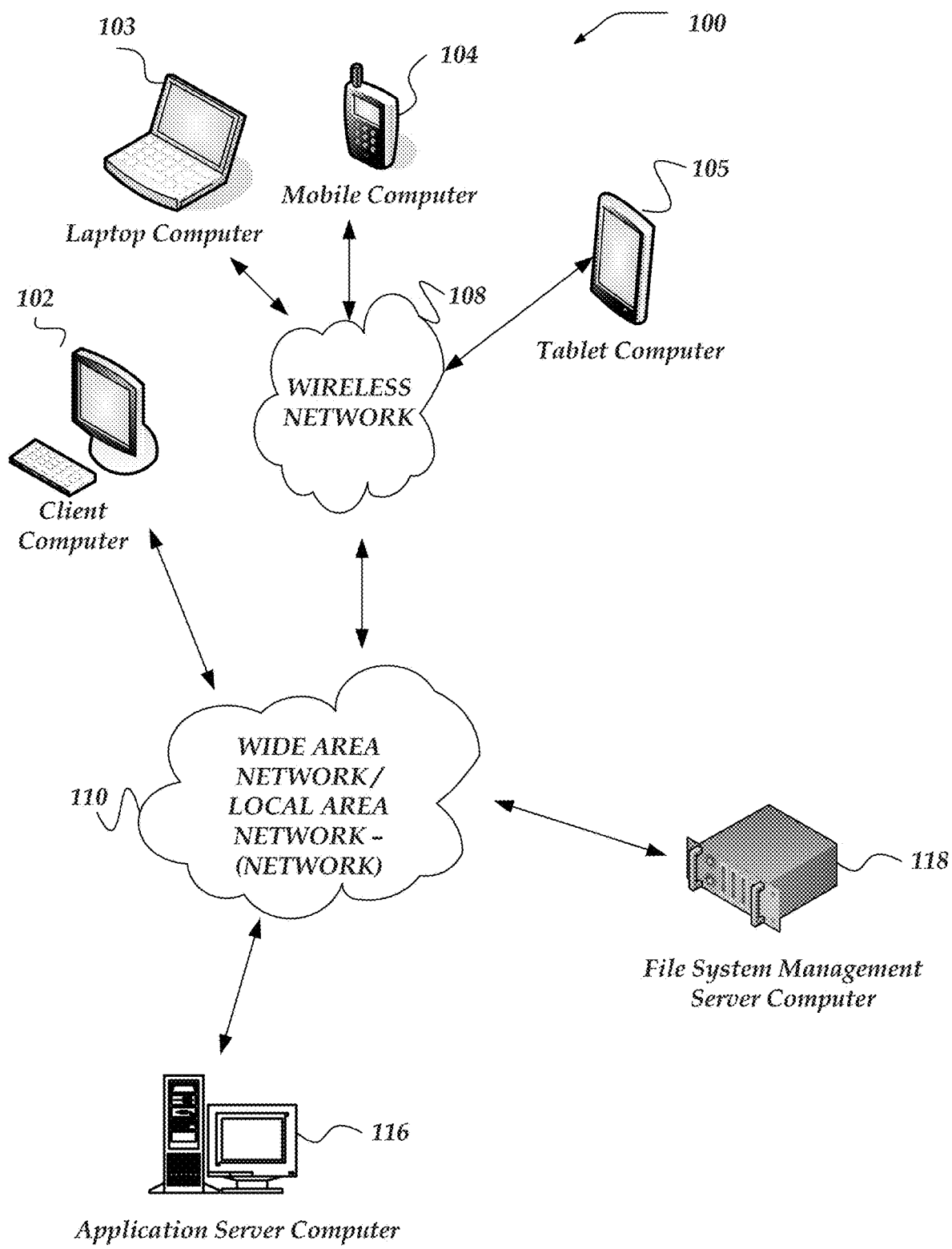
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to discrete sized units of data that comprise a file system object. For example, small sized file system objects, such as, directory objects or small files may be comprised of a single block. Whereas, larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects may be of various sizes, comprised of the number of blocks necessary to represent or contain the entire file system object. Further, blocks may be considered or referred to as file system objects.

As used herein the term "plug-in" refers to one or more installed modules that may provide computer readable instructions, configuration information, rules, threshold values, parameter values, or the like, or combination thereof. Plug-ins may be used to define one or more pre-fetch policies, pre-fetch policies parameters/threshold values, rules, or the like. More than one plug-in may be installed at the same, each providing different or alternative information or policies. Additional plug-in may be provided or customized to support various pre-fetch policies that may support the operational considerations of the file systems.

As used herein the term "configuration information" refers to information that may include rule based policies, pattern matching, scripts (e.g., computer readable instructions), dependency information, or the like, that may be provided from various sources, including, configuration files, databases, user input, built-in defaults, or the like, or combination thereof.

As used herein the term "pre-fetch policy" refers to rules or definitions that determine which blocks or how many blocks should be copied from a file storage tier to a pre-fetch storage tier. In some cases, the same pre-fetch policy may be used for all read requests. In other cases, there may be more than one pre-fetch policy. Accordingly, in some embodiments, one or more selection criteria may be employed to select one pre-fetch policy from among others.

As used herein the term "score model" refers to rules or definitions that determine if a selected pre-fetch policy should be executed. Accordingly, the score model for a pre-fetch policy may be evaluated to determine if a pre-fetch policy may be executed. Score model instances store or otherwise persist one or more pre-fetch score values.

As used herein the term "score rule" refers to computer readable instructions that are arranged to compute sub-scores within the context of a score model. A score model may include more than one score rules.

As used herein the term "request score" refers to values that represent a grade or the effectiveness or overall success of a completed pre-fetch session. In general, computer readable instructions for generating a request score may be associated with or included in the pre-fetch policy that was used to perform the pre-fetch.

As used herein the term "file storage tier," and "file storage" refer to a digital data store that provides long term or bulk storage for file system objects in a file system. File storage may be comprised of various storage devices (hard drives, SSDs, or the like) that are arranged in various configurations. File storage provides normal or regular data storage for a distributed system. File storage may be distributed across multiple devices or locations. File storage may be comprised of local or remote physical devices, cloud based storage, or the like, or combination thereof.

As used herein the term "pre-fetch storage tier," and "pre-fetch storage" refer to a digital data store that provides performant short term storage that is used to store pre-fetched data blocks. Pre-fetch storage may be comprised of various storage devices (hard drives, SSDs, or the like) that are arranged in various configurations. Pre-fetch storage may be distributed across multiple devices or locations. Pre-fetch storage may be comprised of local or remote physical devices, cloud based storage, or the like, or combination thereof. Pre-fetch storage is arranged to be faster or otherwise more responsive to read requests. In most cases, pre-fetch storage is comprised of storage devices, such as, SSDs, that are faster to read and more expensive than devices used for conventional file storage. Pre-fetch storage may be limited resource as compared to file storage. Accordingly, innovations described herein include one or more embodiments for improved utilization of pre-fetch storage.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In some embodiments a pre-fetch engine may be instantiated to perform various actions as described below.

In one or more of the various embodiments, the pre-fetch engine may be arranged to receive one or more requests from a client of the file system such that the file system includes a pre-fetch storage tier and a file storage tier of one or more storage devices.

In one or more of the various embodiments, the pre-fetch engine may be arranged to determine a pre-fetch policy based on the one or more requests and a score model, such that the pre-fetch policy determines one or more blocks on the file storage tier to copy to the pre-fetch storage tier. And, in some embodiments, the score model includes two or more score rules where one of the two or more score rules may be associated with a client score. In some embodiments, the two or more score rules may be associated with configuration information that may be executed by the pre-fetch engine to compute the one or more scores.

In one or more of the various embodiments, determining the pre-fetch policy, includes selecting the pre-fetch policy based on one or more attributes associated with the request such that the one or more attributes include one or more of client identity, client type, geographic location of the client, time-of-day, day-of-week, an application associated with the client, communication method, a number of objects requested, or the like.

In one or more of the various embodiments, the pre-fetch engine may be arranged to determine one or more scores that may be associated with the two or more score rules such that the one or more scores are based on one or more previous requests made by the client. In one or more of the various embodiments, determining one or more scores may include selecting the one or more scores based on information included in the request such that the information includes one or more of a network identity of the client, a user identity associated with the client, a group identity associated with the client, or the like.

In response to at least one of the one or more scores exceeding a threshold value, in one or more of the various embodiments, the pre-fetch engine may be arranged to copy the one or more blocks to the pre-fetch storage tier based on the pre-fetch policy.

In one or more of the various embodiments, the pre-fetch engine may be arranged to update the one or more scores based on a performance of the pre-fetch policy such that the one or more scores may be increased based on a number of pre-fetched blocks that are subsequently requested by the client. And, in some embodiments, the one or more scores may be decreased based on the number of pre-fetched blocks that remain unrequested by the client.

In one or more of the various embodiments, updating the one or more scores, may include: determining a file score that corresponds to the number of pre-fetched blocks that are requested by the client minus the number of pre-fetched blocks that remain unrequested by the client;

determining a directory score that corresponds to a sum of one or more file scores that correspond to files in the directory, wherein the one or more file scores are associated with the client; and determining a client score that corresponds based on one or more directory scores that are associated with the client.

In one or more of the various embodiments, the pre-fetch engine may be arranged to discard one or more portions of the one or more scores based on criteria included in the pre-fetch policy such that the criteria includes one or more of a timeout value, a memory quota, or a maximum number of scores.

In one or more of the various embodiments, the pre-fetch engine may be arranged to copy the one or more blocks to the pre-fetch storage tier based on the pre-fetch policy in response to a majority of the one or more scores exceeding a defined threshold.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message.

In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier.

Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructureoriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another.

In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or file system management server computer 118 are described in more detail below in conjunction with FIG. 3. Although FIG. 1 illustrates application server computer 116 and file system management server computer 118 each as a single computer, the innovations or embodiments are not so limited. For example, one or more functions of application server computer 116, file system management server computer 118, or the like, may be distributed across one or more distinct network computers. Moreover, in one or more embodiments, file system management server computer 118 may be implemented using a plurality of network computers. Further, in one or more of the various embodiments, application server computer 116, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
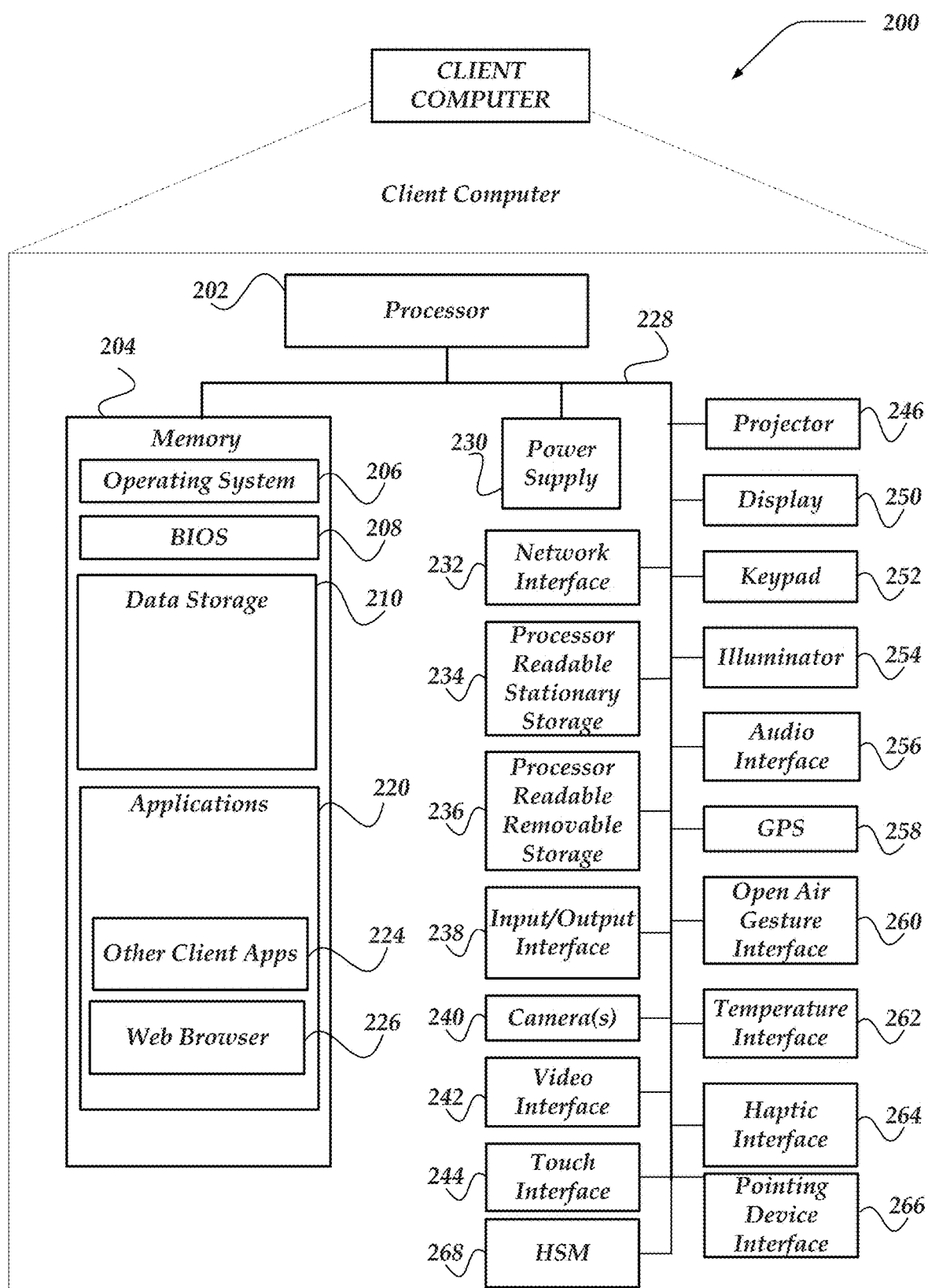
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
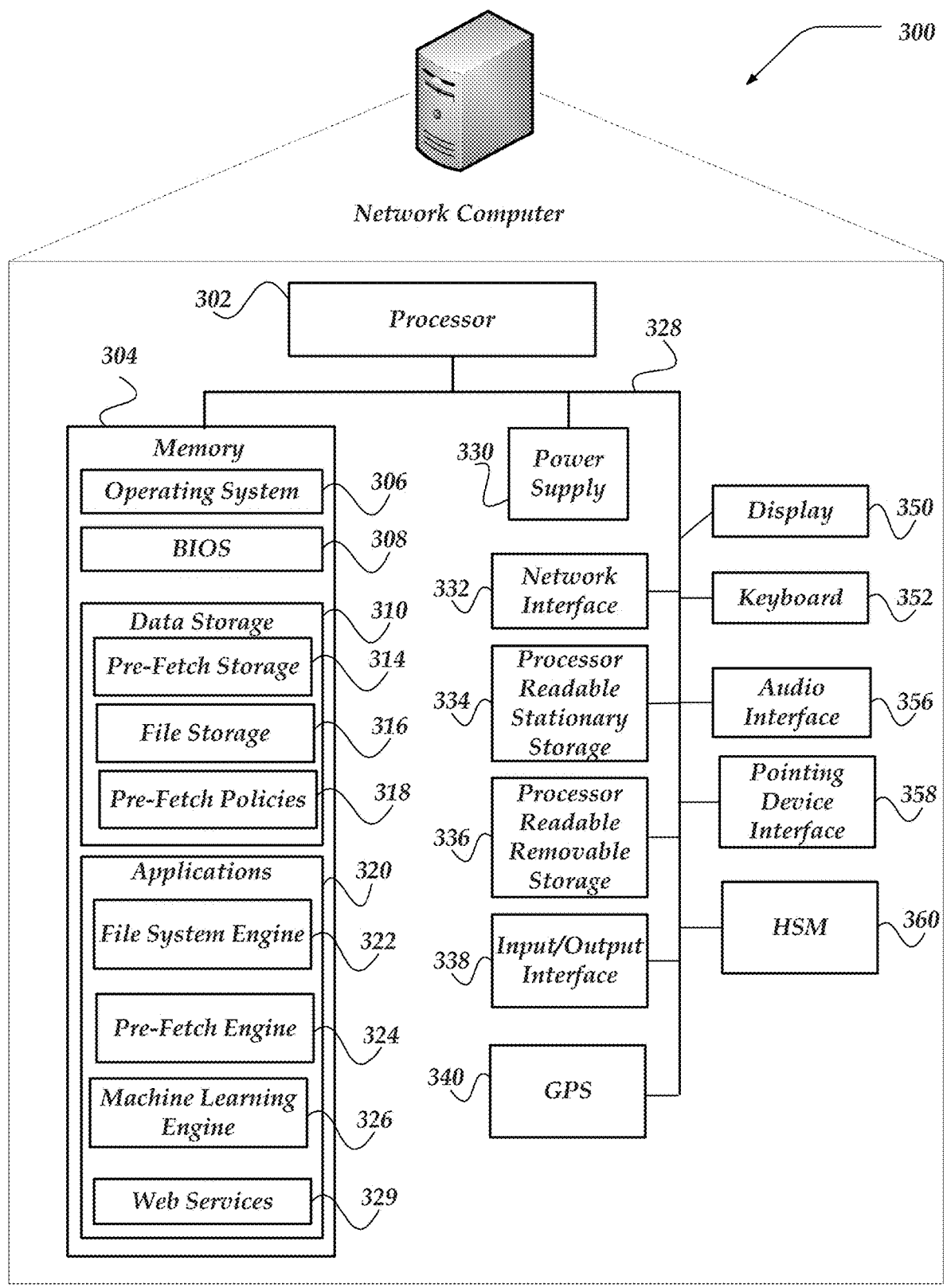
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or file system management server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, pre-fetch engine 324, machine learning engine 326, web services 329, or the like, may be arranged to employ geo-location information to select one or more localization features, such as, time zones, languages, currencies, currency formatting, calendar formatting, or the like. Localization features may be used in file system meta-data, file system objects, file systems, permissions, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, pre-fetch storage 314, file storage 316, pre-fetch policies 318, or the like. pre-fetch storage 314 or file storage 316 may store files, documents, versions, properties, permissions information, file meta-data, data structures, or the like, that represent one or more portions of a distributed file system. In some embodiments, various storable objects (e.g., file system objects) may be divided into one or more blocks or pages that are stored pre-fetch storage 314 or file storage 316.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, pre-fetch engine 324, machine learning engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, pre-fetch engine 324, machine learning engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, pre-fetch engine 324, machine learning engine 326, web services 329, or the like, may be provisioned and de-commissioned automatically.

Also, in one or more of the various embodiments, file system engine 322, pre-fetch engine 324, machine learning engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
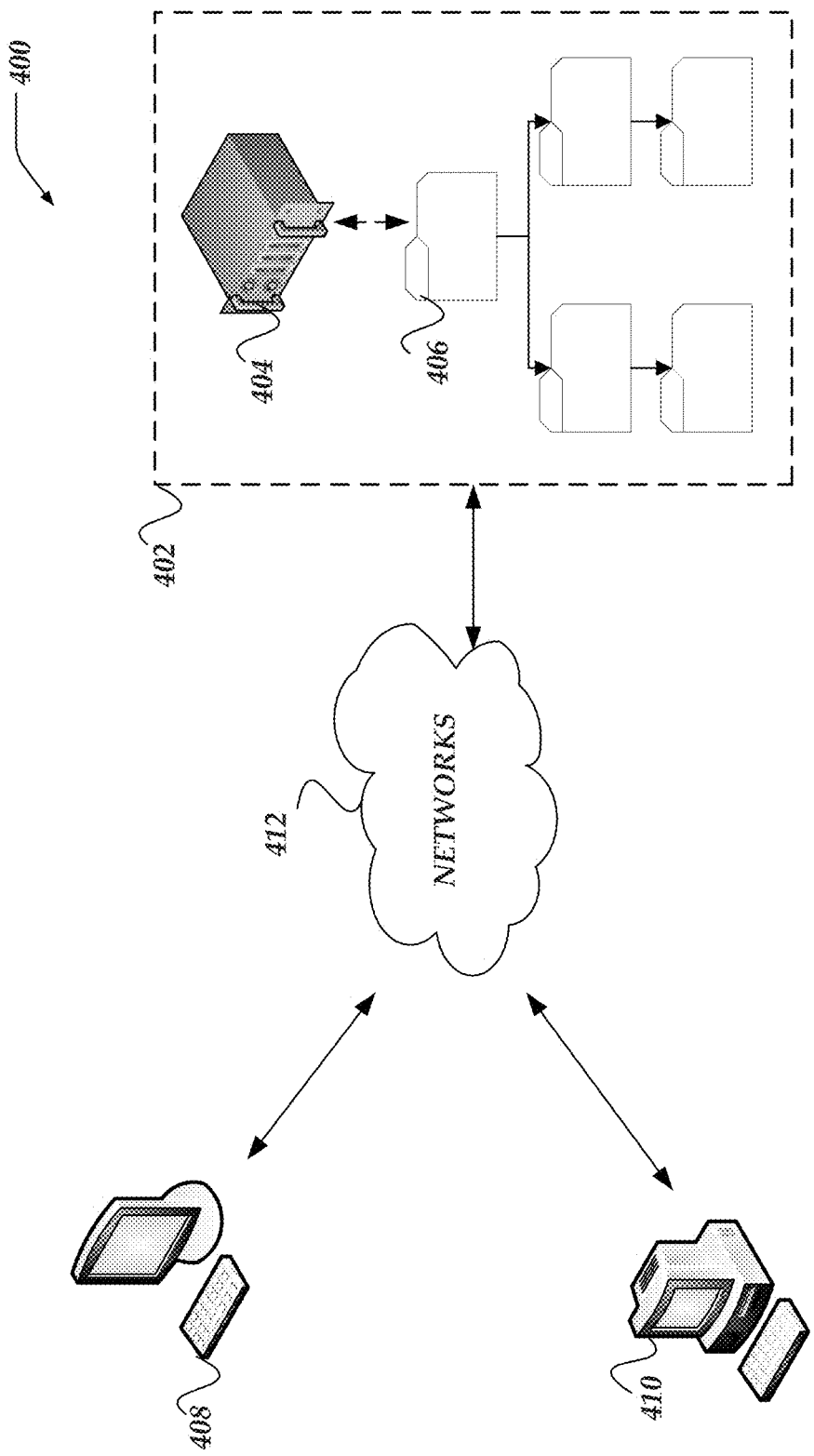
FIG. 4 illustrates a logical architecture of a system for a client aware pre-fetch policy scoring system in accordance with one or more of the various embodiments.

FIG. 4 illustrates a logical architecture of system 400 for a client aware pre-fetch policy scoring system in accordance with one or more of the various embodiments. In one or more of the various embodiments, file systems, such as, file system 402 may be communicatively coupled to one or more networks, such as, networks 412. Accordingly, in one or more of the various embodiments, one or more clients, such as, client computer 408 and client computer 410 may be arranged to access file system 402 over networks 412. In some embodiments, clients of file system 402 may include users, services, programs, computers, devices, or the like, that may be enabled to perform one or more file system operations, such as, creating, reading, updating, or deleting data (e.g., file system objects) that may be stored in file system 402. In some embodiments, file system 402 may comprise one or more file system management computers, such as file system management computer 404. Also, in one or more of the various embodiments, file systems, such as file system 402 may include one or more file system objects, such as file system object 406 that may represent the various objects or entities that may be in file system 402. In some embodiments, file system objects may include, files, documents, directories, folders, change records, file system journals, backups, snapshots, replication information, versions, branches, blocks, pages, or the like. In some embodiments, primitive file system objects, such as, blocks or pages, may be used to compose more complex file system objects.

In one or more of the various embodiments, the implementation details that enable file system 402 to operate may be hidden from clients such that they may be arranged to use file system 402 the same way they use other file systems, including local file systems. Accordingly, in one or more of the various embodiments, clients may be unaware that they are using a file system that supports one or more pre-fetch storage tiers because file system engines or cache engines may be arranged to mimic the interface or behavior of native file systems used by the clients.

Also, while file system 402 is illustrated as using one file system management computer with one set of file system objects, the innovations described herein are not so limited. Innovations herein contemplate file systems that include one or more file system management computers or one or more file system object data stores. In some embodiments, file system object stores (e.g., file storage 316) may be located remotely from one or more file system management computers. Also, a logical file system object store or file system may be spread across two or more cloud computing environments, storage clusters, one or more on-premises servers, or the like, or combination thereof.

Figure 5:
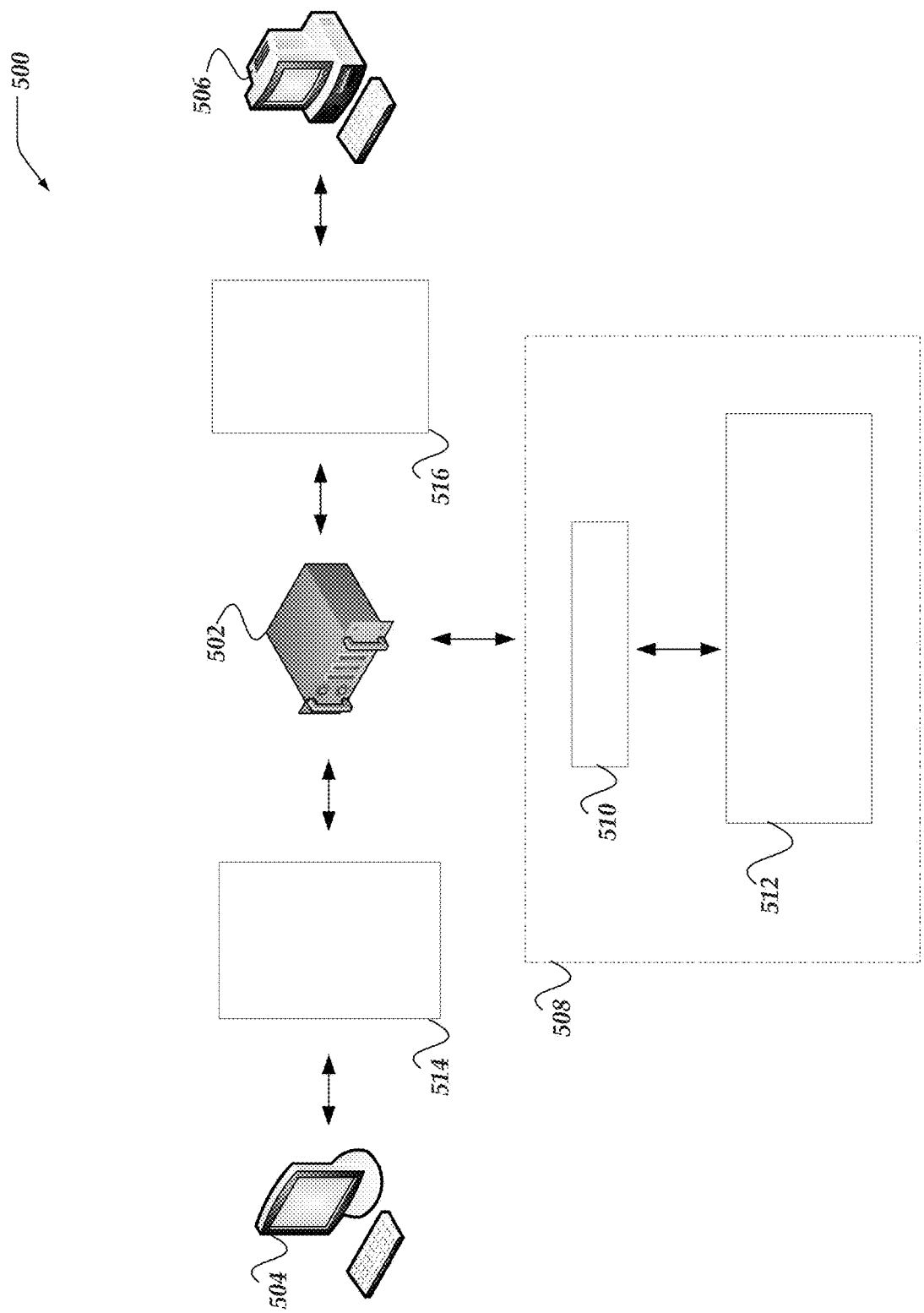
FIG. 5 illustrates a logical architecture of a file system that supports one or more pre-fetch policies in accordance with one or more of the various embodiments.

FIG. 5 illustrates a logical architecture of file system 500 that supports one or more pre-fetch policies in accordance with one or more of the various embodiments. As described above, file systems may include one or more file system management server computers, such as, file system management server computer 502. Also, in one or more of the various embodiments, one or more client computers, such as, client computer 504 and client computer 506 may access (e.g., read, write, or delete) one or more file system objects, such as, file system object 514 or file system object 516.

In one or more of the various embodiments, file system management server computer 502 may be arranged to store or manage the storage of file system objects. In some embodiments, data storage 508 may represent one or more data storage systems or devices that may be used to store file system objects. In some embodiments, one or more data stores, such as, data storage 508 may include one or more pre-fetch storage tiers, such as, pre-fetch storage 510. Also, in some embodiments, data storage 508 may include one or more file storage tiers, such as file storage 512.

In one or more of the various embodiments, file system management server computer may be arranged to manage the distribution of file system objects onto pre-fetch storage 510 or file storage 512. In some embodiments, this may include managing or executing one or more pre-fetch policies that predictively store one or more file system objects (e.g., blocks) from file storage in pre-fetch storage.

Accordingly, in one or more of the various embodiments, file system management server computer may include one or more pre-fetch engines that may be instantiated to perform one or more actions to manage the selection of pre-fetch policies, evaluation of pre-fetch policies, execution of pre-fetch policies, or the like.

In one or more of the various embodiments, pre-fetch policies may provide the instructions or rules that govern copying blocks from file storage to pre-fetch storage before a read request for the pre-fetched block is provided to file system management server computer 502. Accordingly, in one or more of the various embodiments, if one or more initial read requests are provided, the pre-fetch engine may be arranged to select a pre-fetch policy that is executed to pre-fetch additional blocks before a client has requested them. In one or more of the various embodiments, one or more performance metrics associated with the selected pre-fetch policy may be collected or tracked to evaluate the pre-fetch policy.

In one or more of the various embodiments, pre-fetch engines may be arranged to execute one or more pre-fetch policies that determine which blocks or how many to pre-fetch. In some embodiments, the pre-fetch engine may be arranged to select a pre-fetch policy for each client session or request session. Accordingly, in some embodiments, performance metrics may be tracked or associated with a given pre-fetch policy. However, in some embodiments, the success of a pre-fetch policy may depend on the behavior of the clients that are making the requests.

Note, for brevity and clarity, data storage 508 is illustrated as having one pre-fetch storage and one file storage, one of ordinary skill in the art will appreciate that these innovations are not so limited. For example, in some embodiments, data storage for a file system may include two or more pre-fetch storage tiers or two or more file storage tiers. Accordingly, the innovations disclosed herein may be applied to systems having one or more pre-fetch storage tiers or one or more file storage tiers.

Figure 6:
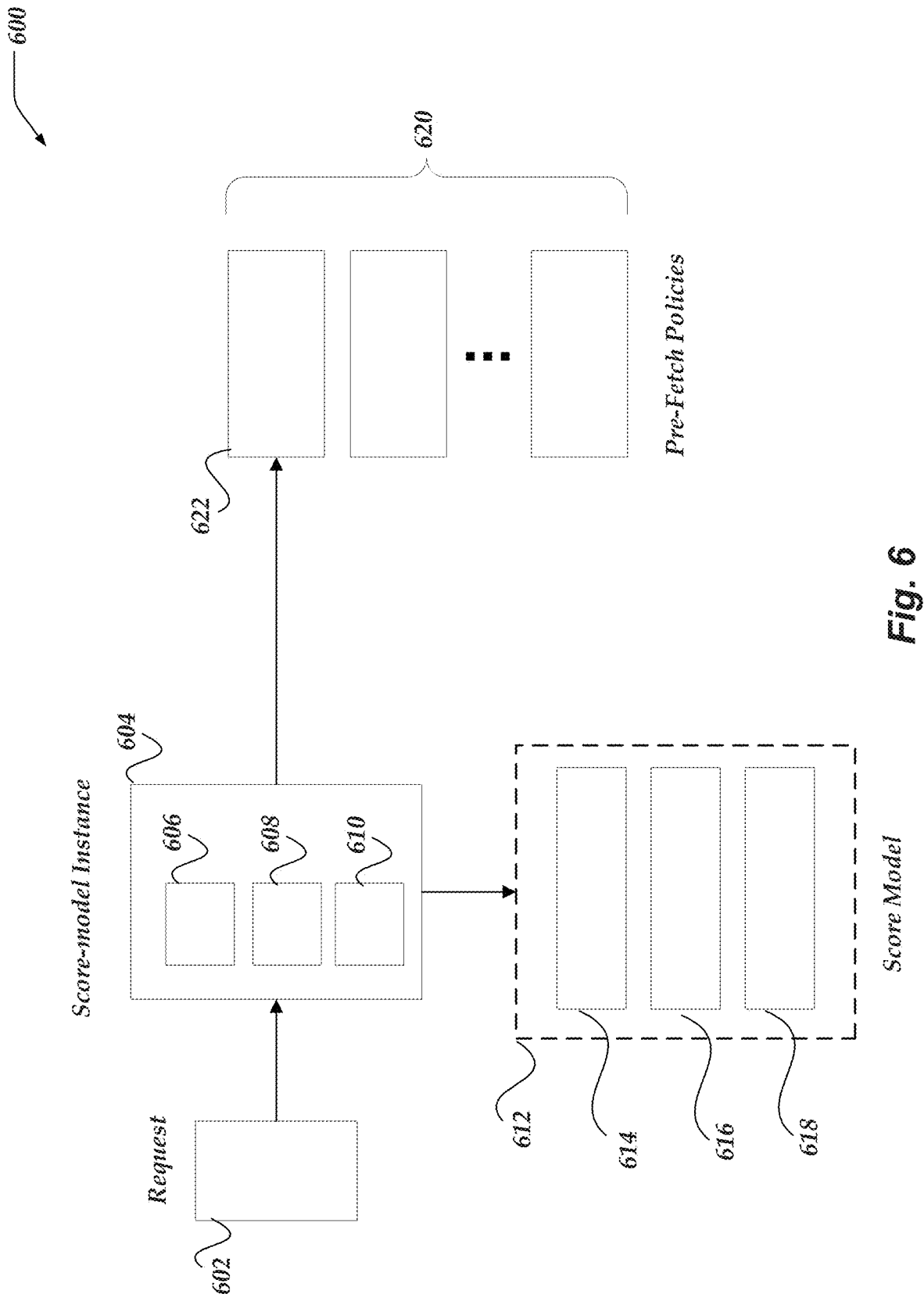
FIG. 6 illustrates a logical architecture of a pre-fetch policy that supports client aware pre-fetching in accordance with one or more of the various embodiments.

FIG. 6 illustrates a logical architecture of pre-fetch policy 600 that supports client aware pre-fetching in accordance with one or more of the various embodiments. In one or more of the various embodiments, various clients of a file system may provide requests, such as, request 602 to read or access data that is stored in the file system. In some embodiments, request 602 may be arranged to include information that enables a file system engine to perform various actions, such as, identifying, locating, retrieving, copying, or the like, one or more data blocks on behalf of the client. However, in some embodiments, request 602 may omit context information related to the applications or services that may be associated with the request.

Also, in one or more of the various embodiments, the request information may represent just a portion of the data blocks that may be required by the requesting client. Accordingly, in some embodiments, administrators of the file system may recognize that in many cases there may be subsequent requests that are associated with the same client activity. And, that in some cases, it may be advantageous to copy some data blocks from the file storage tier to the pre-fetch storage tier in anticipation of subsequent requests from the same or similar clients. For example, if a client sends a request to obtain a first portion of a video file, a reasonable pre-fetch policy may be configured to pre-fetch additional portions of the video file in anticipation of subsequent requests to obtain the additional portions of the video file rather than waiting until the client sends the requests.

However, as described herein, the storage space in the pre-fetch storage tier may be limited resource. Thus, in some embodiments, filling the pre-fetch storage tier up with pre-fetched data that is never requested may be disadvantageous. Likewise, in one or more of the various embodiments, omitting pre-fetching completely may be disadvantageous. Accordingly, in one or more of the various embodiments, a file system may be arranged to select and execute one or more pre-fetch policies, such as, pre-fetch policy 622 to select data blocks for pre-fetching. In some embodiments, the pre-fetch engine may be arranged to have one or more pre-fetch policies, such as pre-fetch policies 620 to select from.

In one or more of the various embodiments, pre-fetch policies 620 may be comprised of one or more data structures that may include or reference computer readable instructions or configuration information that define the actions associated with the policy. In some embodiments, file system engines or pre-fetch engines may be arranged to employ pre-fetch policy to determine if data blocks are copied from the file storage tiers to pre-fetch storage tiers.

In one or more of the various embodiments, score models instances, such as score model instance 604 may be employed by pre-fetch engines to associate scores, such as, score 606, score 608, and score 610, that may at least represent how effective pre-fetching has been for the client making the request. In some embodiments, score model instances may be data structures that include or reference score models that may be associated with one or more score rules, such as, score rule 614, score rule 616, score rule 618, or the like.

In one or more of the various embodiments, pre-fetch engines may be arranged to employ score models to determine if pre-fetching should be initiated for a given request. In one or more of the various embodiments, each of the score rules in a score model may be comprised of configuration information that computes a score. In some embodiments, if the scores produced by the score rules exceed a defined threshold or otherwise meet conditions included in the pre-fetch policy, then pre-fetching may be performed for a request. In one or more of the various embodiments, pre-fetch engines may be arranged to pre-fetch data for a request if each executed score rule in the score model indicates that pre-fetching should occur.

In some embodiments, the scores associated with pre-fetch policies or score models may be captured or stored in score model instances, such as, score model instance 604. In some embodiments, score model instances may be associated with the request or the client making the request. In one or more of the various embodiments, score model instances may include fields or attributes for tracking the scores for some or all of the score rules in a score model.

In one or more of the various embodiments, score models may be arranged to score rules that represent different scope. For example, in some embodiments, a score rule, such as, score rule 614 may be associated with a file. And, for example, in some embodiments, score rule 616 may be associated with a higher level object, such as, a directory, folder, group, or the like, that represents a portion of file system that includes that file object associated with the request. Finally, in some embodiments, score rule 618 may be arranged to score the client that is associated with the request.

Accordingly, in one or more of the various embodiments, as requests are received the pre-fetch engine determines if it should pre-fetch data based on the score model instance and its associated score model. In some embodiments, the pre-fetch engine may be arranged to determine if pre-fetching should occur and which pre-fetch policy to use based on the score model. The pre-fetch engine perform pre-fetching as defined by the determined pre-fetch policy, if any. In some embodiments, score models may be arranged to require that all of its score rules must be passed before enabling pre-fetching.

In one or more of the various embodiments, score rules may provide scores that are associated with different lifetimes. In some embodiments, upon the expiration of their associated lifetime limit, score values stored in score model instances may be discarded.

In some embodiments, score rules in a score model may be arranged to roll-up or aggregate score values from other score rules in the same model. In some embodiments, score rules associated with shorter lifetimes or smaller scopes may be employed to provide or modify the score values associated with score rules that may have a larger scope or longer lifetime. Accordingly, in some embodiments, score models may be arranged to have one or more score rules feed into other score rules. For example, the scores produced by the narrowest scoped rules may be fed into one or more broader scoped score rules.

In some embodiments, a score rule, such as, score rule 614 may be associated with a pre-fetch score for a file. Accordingly, in some embodiments, score rule 614 may be employed by the pre-fetch engine to compute score 606 based on the previous pre-fetches done for the same file. Further, in some embodiments, another score rule, such as, score rule 616 may be associated with the folder or directory that contains the file associated with the requested file. Accordingly, in some embodiments, score rule 616 may enable the computation of scores based on the scores produced by score rule 614 (e.g., score 606). Likewise, in some embodiments, a score rule, such as, score rule 618 may be associated with the client making the requests. Accordingly, score rule 618 may be arranged to compute a score based on scores (e.g., score 608) provided by score rule 618.

Accordingly, in one or more of the various embodiments, at the completion of a request, the pre-fetch engine computes evaluates a pre-fetch score for each score rule. In some embodiments, this may include evaluating the actual blocks that were pre-fetched to assign a score to the narrowest scoped rule, such as score rule 614, in this example. In some embodiments, if a score for score rule 614 is updated, the pre-fetch engine may be arranged to update the score value associated with score rule 616 based on the score associated with score rule 614. And, likewise, in some embodiments, the pre-fetch engine may be arranged to update the score value associated with score rule 618 based on the score associated with score rule 616. Note, in some embodiments, providing or updating a score value implies that the values may be stored in a score-model instance that may be persisted so the scores may be recalled as necessary.

In some embodiments, score model instances include the score information computed by the score rules of a score model. In file systems that service many requests, keeping score model instances available for extended periods may require a prohibitive amount of memory or storage space. Accordingly, in some embodiments, a score model may define life-time rules that may apply to score model instances, or the like.

Accordingly, in one or more of the various embodiments, pre-fetch engines may be arranged to reduce the storage overhead required by the score model instances by discarding a portion of the score information based on various criteria, such as, lifetime expiry values, end-of-sessions, or the like.

In one or more of the various embodiments, pre-fetch engines may be arranged to associate different score rules with different discard criteria. In some embodiments, some score rules may be associated with shorter lifetimes while other score rules may be associated with longer lifetimes.

Accordingly, in one or more of the various embodiments, as time passes the values associated with the shorter lifetimes will be discarded before the values associated with the score rules that may be associated with longer lifetimes.

Accordingly, in some embodiments, two or more score rules may be arranged in a hierarchy such that narrower scoped rules with shorter lifetimes are used to evaluate the pre-fetch performance for each request. The score instances associated with short lifetimes may represent real-time or near real-time pre-fetch performance. Other score rules in the score model may be associated with score instances that have longer lifetimes. In some embodiments, one score rule in a score model may be arranged to have score instances that have the longest lifetime. In some embodiments, this longest lived scores may be associated with the client that is associated with the request.

In this example, for one or more of the various embodiments, score model instance 604 represents the scores that may be associated with a particular client. As mentioned above, in some embodiments, score models may be arranged to include more than one score rule. Accordingly, in some embodiments, each score value for the various score rules may be arranged to have different instance life-times, scope, scoring strategies, or the like. Thus, in some embodiments, score instance values, such as, score instance 606, score instance 608, score instance 610, or the like, may be arranged to track the pre-fetch/request performance scores that may be associated with a client. In some embodiments, a score model instances, such as, score model instance 604 may be associated with each client that makes requests of the file system. Note, in some embodiments, this association and its corresponding score model instance may also be associated with a lifetime duration. Thus, in some embodiments, the client score information may be discarded if does make another request before the expiration of its lifetime duration.

In one or more of the various embodiments, at the completion of a request, a pre-fetch engine may be arranged to compute the one or more scores that represent the quality of a completed pre-fetch operation. Accordingly, in one or more of the various embodiments, request scores may be computed based the score rules associated with the score model that was employed to select the pre-fetch policy (e.g., pre-fetch policy 622). These scores may be stored in a score model instance that is associated with the completed request. For example, in some embodiments, score rule 614 may define the rule for computing a request score that is stored in score instance 606.

Generalized Operations

FIGS. 7-10 represent generalized operations for client aware pre-fetch policy scoring system in accordance with one or more of the various embodiments. In one or more of the various embodiments, processes 700, 800, 900, and 1000 described in conjunction with FIGS. 7-10 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-10 may perform actions for client aware pre-fetching in accordance with at least one of the various embodiments or architectures such as those described in conjunction with FIGS. 4-6. Further, in one or more of the various embodiments, some or all of the actions performed by processes 700, 800, 900, and 1000 may be executed in part by file system engine 322, pre-fetch engine 324, or machine learning engine 326 running on one or more processors of one or more network computers.

Figure 7:
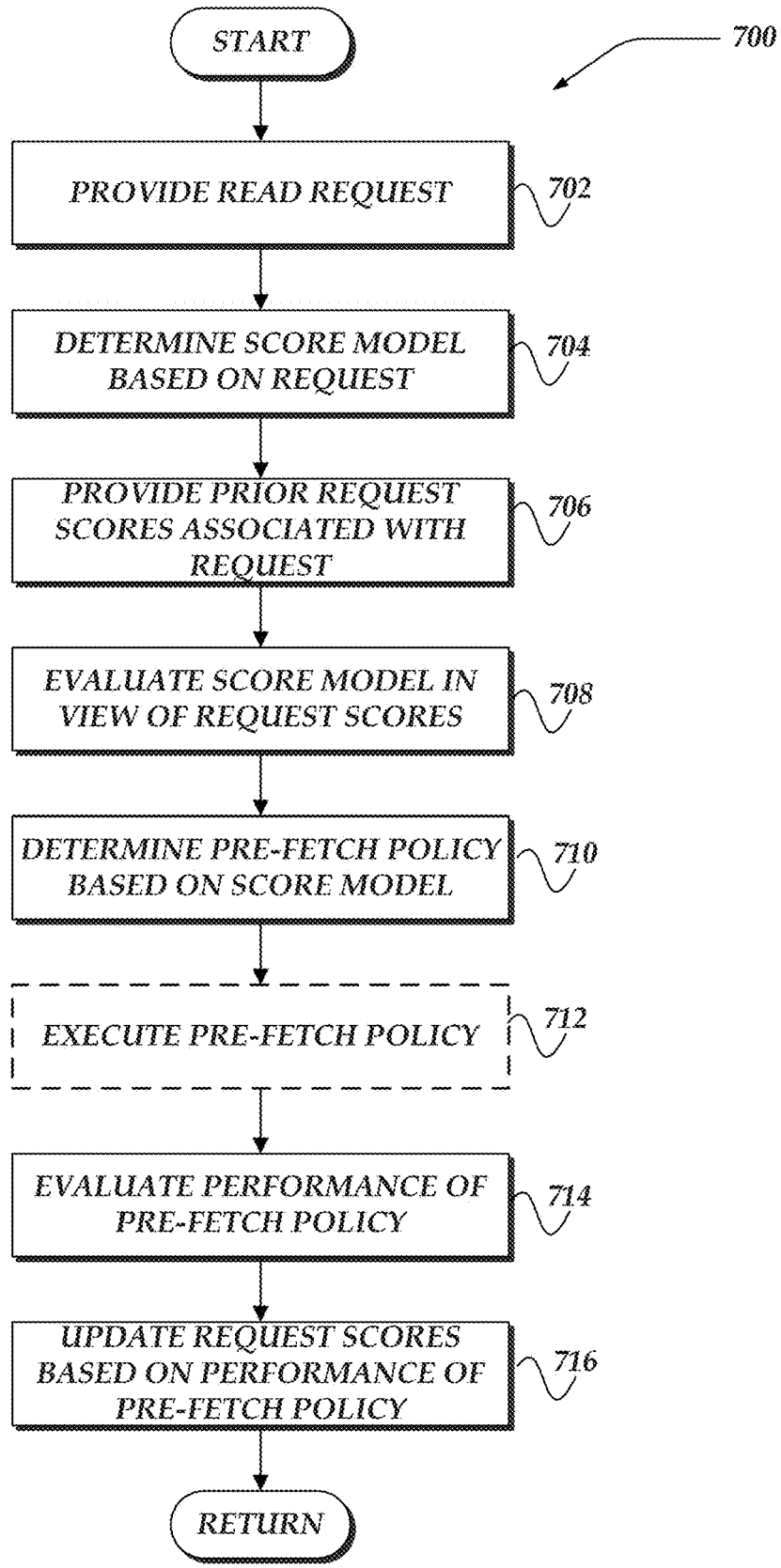
FIG. 7 illustrates an overview flowchart of a process for client aware pre-fetch policy scoring system in accordance with one or more of the various embodiments.

FIG. 7 illustrates an overview flowchart of process 700 for client aware pre-fetch policy scoring system in accordance with one or more of the various embodiments. After a start flowchart block, at flowchart block 702, in one or more of the various embodiments, a read request may be provided. As described above, file systems, file system engines may receive various requests from file system clients. In some cases, one or more read requests may be received. In some embodiments, read requests may be arranged to request the contents or other information that may be associated with a file system object, such as, a file, document, one or more blocks, or the like.

Accordingly, in one or more of the various embodiments, file system engines may forward the request to a pre-fetch engine to determine if pre-fetching of data associated with the request should occur. In some embodiments, the file system engine may pass the request as is to the pre-fetch engine. In some embodiments, the file system engine may be arranged to filter, modify, or annotate the requests before providing them to the pre-fetch engine.

At flowchart block 704, in one or more of the various embodiments, the pre-fetch engine may be arranged to determine a score model instance based on the request. In one or more of the various embodiments, various attributes associated with the request may be employed in the matching process, including, client identity, client type, geographic location of client, time-of-day, day-of-week, client application, communication method, number of objects requested, size of the objects requests, or the like, or combination thereof.

At flowchart block 706, in one or more of the various embodiments, the pre-fetch engine may be arranged to provide one or more scores (e.g., score instances) associated with prior requests made by the same client. Accordingly, in some embodiments, if there are prior request scores available for the requesting client, they may be retrieved or determined.

At flowchart block 708, in one or more of the various embodiments, the pre-fetch engine may be arranged to evaluate the score model in view of the request scores. In one or more of the various embodiments, score models may be arranged to include one or more rules or conditions that may be executed or evaluated to determine if data blocks that may be associated with request will be copied from a file storage tier to a pre-fetch storage tier before they are requested. In some embodiments, the pre-fetch policy may be arranged to include one or more rules or instructions that may be executed or evaluated to determine the particular data blocks that may be pre-fetched. For example, in some embodiments, a pre-fetch policy for streaming video clients employ a difference strategy than a database service that is collecting data in response to a query. In some embodiments, the pre-fetch policy may be employed or reused for multiple clients that may be associated with different organizations.

At flowchart block 710, in one or more of the various embodiments, the pre-fetch engine may be arranged to determine a pre-fetch policy based on the score model. In one or more of the various embodiments, pre-fetch policies may be associated with one or more score models. In some embodiments, the evaluation of the score model instance may be employed by the pre-fetch engine to select a pre-fetch policy from among one or more available pre-fetch policies. Accordingly, in some cases, for some embodiments, depending on the score model instance, the pre-fetch engine may determine that pre-fetching using one or more of the available pre-fetch policies may not be appropriate at this time. At flowchart block 712, optionally, in one or more of the various embodiments, the pre-fetch engine may be arranged to execute the selected pre-fetch policy. In one or more of the various embodiments, if the evaluation of the prior request scores (e.g., score instances) satisfy the score model, the pre-fetch policy may be selected for execution. In other cases, if the request scores do not satisfy the score model, pre-fetching may be denied or omitted.

This flowchart block is indicated as being optional because in some embodiments a pre-fetch policy may not be executed for each request. Whether a pre-fetch policy is executed may depend on the result of the evaluation of the prior request scores associated with the score model instances using the score rules associated with the score model.

At flowchart block 714, in one or more of the various embodiments, the pre-fetch engine may be arranged to evaluate the performance of the pre-fetch policy. In one or more of the various embodiments, at the completion of one or more read requests, the pre-fetch engine may be arranged to determine how many of the pre-fetched data blocks were actually requested in subsequent requests provided by the same client.

In some embodiments, the criteria for evaluating the performance of a pre-fetch policy for a client may vary depending on the pre-fetch policy or the score model. However, in some embodiments, generally, it is disadvantageous to pre-fetch data blocks that are not requested because resources are used to pre-fetch blocks that are not used. In some embodiments, blocks that have been copied from file storage to pre-fetch storage and then not subsequently requested by the same client may be considered waste. Accordingly, in some embodiments, generating waste may result in reduced request scores. Likewise, in some embodiments, the number of pre-fetched blocks that are subsequently requested may improve the request scores associated with the client.

At flowchart block 716, in one or more of the various embodiments, the pre-fetch engine may be arranged to update the request scores associated with the client based on the performance of the pre-fetch policy. As described above, in some embodiments the pre-fetch engine employ data structures such as score instances to preserve some or all of the request scores that may be associated with a client. In one or more of the various embodiments, the particular format, range, or domain of the scores may be determined based on the score model. For example, if a score model includes three score rules, in some embodiments, request scores for each score rule may be stored or updated. In some embodiments, the one or more score rules may have the same or different criteria for computing a score. Also, in one or more of the various embodiments, different score rules may have different criteria for discarding them. Accordingly, in one or more of the various embodiments, during or separate from the updating the request scores, the pre-fetch engine may determine that one or more score values should be discarded.

Next, control may be returned to a calling process.

Figure 8:
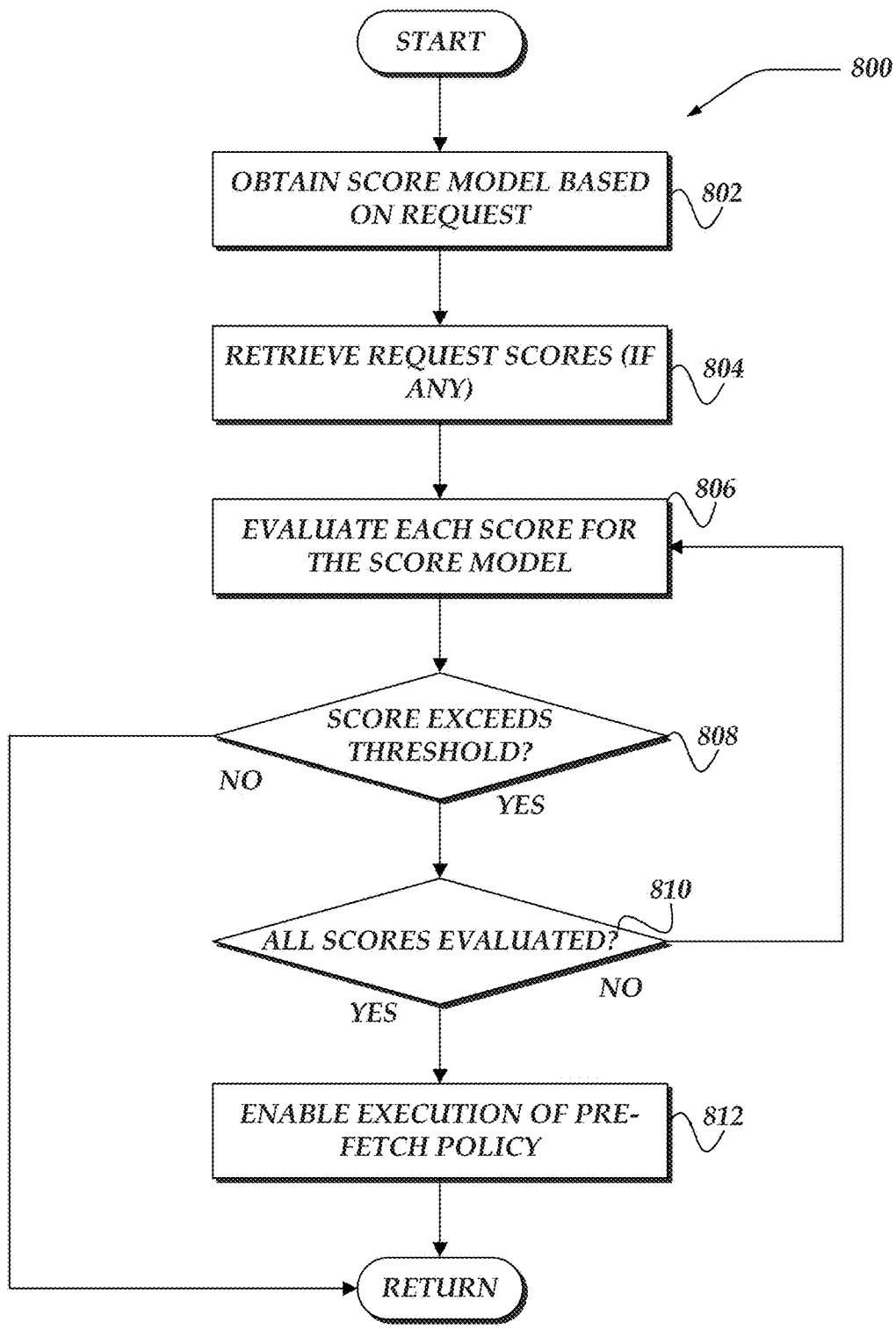
FIG. 8 illustrates a flowchart of a process for client aware pre-fetch policy scoring system in accordance with one or more of the various embodiments.

FIG. 8 illustrates a flowchart of process 800 for client aware pre-fetch policy scoring system in accordance with one or more of the various embodiments. After a start flowchart block, at flowchart block 802, in one or more of the various embodiments, a score model may be provided to the pre-fetch engine based on a pending request. As described above, pre-fetch engine may be arranged to select a score model and an associated score model instance that may be employed to determine a pre-fetch policy.

At flowchart block 804, in one or more of the various embodiments, the pre-fetch engine may be arranged to retrieve request scores (e.g., score instances) if any may be available. In some embodiments, as described above, one or more request scores that were computed based on previous requests may be retrieved. In one or more of the various embodiments, one or more features of the pending request may be employed to lookup the pertinent scores.

In one or more of the various embodiments, one or more request scores may be associated with the client that is making the request. Accordingly, in some embodiments, information included with the request or associated with the request may correspond to a client identity. In some embodiments, this information may be values based on the client, such as, network identity, user identity, group identity, or the like. In some embodiments, a file system engine may generate the client identifiers that that pre-fetch engine employs. Accordingly, in one or more of the various embodiments, the request scores may be associated with a client identifier associated with the request. Thus, as requests are provided to the pre-fetch engine, the request scores associated with the client that may be making the request may be provided.

In one or more of the various embodiments, if request scores are unavailable for the client associated with request, the pre-fetch engine may proceed according to score model. For example, in some embodiments, one or more score models may assign or associate an absence of a score as a minimum score that may prohibit pre-fetching until a sufficient number or type of request scores have been generated by incoming requests. Likewise, in some embodiments, one or more score model may be configured to default to pre-fetching in the absence of request scores associated previously received requests.

At flowchart block 806, in one or more of the various embodiments, the pre-fetch engine may be arranged to evaluate one or more of the score rules included in the score model.

In some embodiments, pre-fetch engines may be arranged to execute the score rules associated with a score models to determine if pre-fetching should occur. In one or more of the various embodiments, the specific value or data type of a score instance may vary depending on a given score rule, score model, pre-fetch policy, or the like, and may include, Boolean values (e.g., true or false), discrete values (e.g., HIGH, MED, LOW, NEUTRAL, or the like), real numbers, percentages, or the like, or combination thereof.

In one or more of the various embodiments, score rules may be configured based on an organization's particular operation needs. Accordingly, in one or more of the various embodiments, various rules may be provided that meet one or more performance goals or requirements of the organization. In some embodiments, the efficacy of a given score rule to meet the requirements of an organization may be determined using custom or conventional methods, such as, observation, testing, monitoring, measuring, or the like.

At decision block 808, in one or more of the various embodiments, if the score associated with a score rule exceeds a defined threshold, control may flow to block 810; otherwise, control may be returned to a calling process. In some embodiments, score models that are associated with more than one score rule may be arranged to require an agreement of all the rules before selecting a pre-fetch policy for pre-fetching blocks. Accordingly, in some embodiments, as shown in process 800, the failure of a single score rule to recommend pre-fetching may prevent pre-fetching from occurring.

However, one of ordinary skill in the art will appreciate that, in some embodiments, score models may be arranged to employ other strategies. For example, in some embodiments, one or more rules in a score model may have more weight than others. Or, for example, the score model may be arranged to seek a consensus result from its two or more rules that requires a majority of rules to recommend pre-fetching. Or, also, for example, a score model may be arranged to select or execute a pre-fetch policy if any of the rules in its score model vote for pre-fetching.

At decision block 810, in one or more of the various embodiments, if the all the scores associated with the score model have been evaluated, control may flow to block 812; otherwise, control may loop back to flowchart block 806. In some embodiments, the criteria for determining if all score rules have been evaluated may vary depending on the score model. In some embodiments, a score model may require that each rule may be expressly tested before determining if pre-fetching should occur.

In other embodiments, or other score models, the score model may employ different criteria, such as, continuing to flowchart block 812, as soon as a consensus has been reached. For example, if a score model has three score rules, it may be configured to signal the pre-fetch engine to terminate the evaluation loop as soon as there are two rules that recommend pre-fetching rather than evaluating all three rules.

At flowchart block 812, in one or more of the various embodiments, the pre-fetch engine may be arranged to select a pre-fetch policy and enable it for execution. Accordingly, the pre-fetch engine may copy one or more data blocks from a file storage tier, such as, file storage 512, to a pre-fetch storage tier, such as, pre-fetch storage 510.

Next, control may be returned to a calling process.

Figure 9:
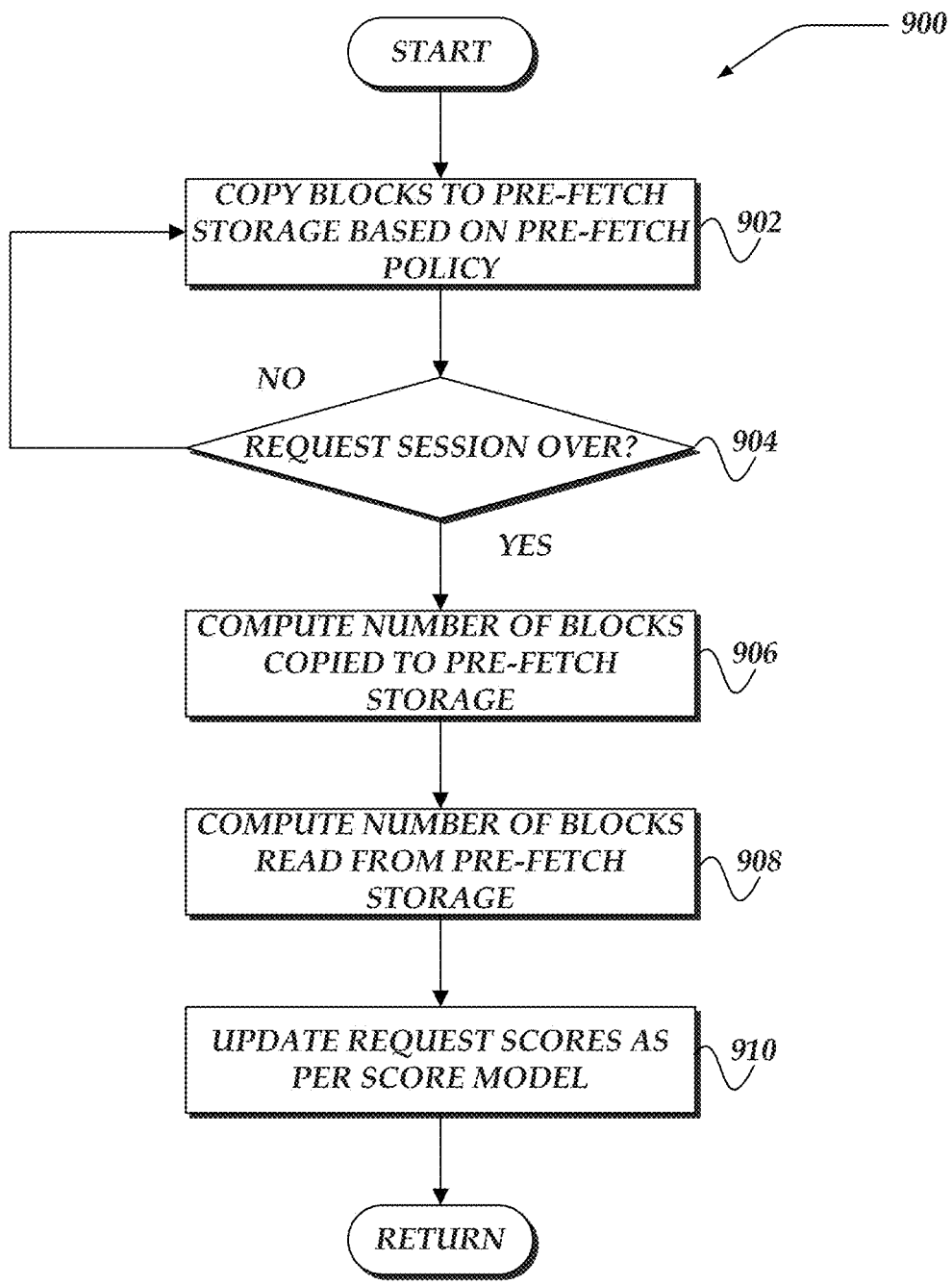
FIG. 9 illustrates a flowchart of a process for executing or evaluating pre-fetch policies in accordance with one or more of the various embodiments.

FIG. 9 illustrates a flowchart of process 900 for executing or evaluating pre-fetch policies in accordance with one or more of the various embodiments. After a start flowchart block, at flowchart block 902, in one or more of the various embodiments, the pre-fetch engine may be arranged to copy blocks from one or more file storage tiers, such as, file storage 512, to one or more pre-fetch storage tiers, such as, pre-fetch storage 510. As described above, in one or more of the various embodiments, the number of blocks and the particular blocks that are pre-fetched may be selected based on the pre-fetch policy being executed.

At decision block 904, in one or more of the various embodiments, if the request session is completed, control may flow to flowchart block 906; otherwise, control may loop back to flowchart block 902. In one or more of the various embodiments, file system engines or pre-fetch engines may be arranged to employ one or more strategies for determining if a request session has ended. For example, in some embodiments, the file system engine may be arranged to consider a session terminated if a duration between requests from the same client exceeds a defined threshold. In some embodiments, for example, the file system engine may be configured to consider the session terminated if a request for data from a different file is received. Further, in some embodiments, a file system engine or pre-fetch engine may be arranged to employ one or more heuristics to determine if a session is terminated.

At flowchart block 906, in one or more of the various embodiments, the pre-fetch engine may be arranged to compute the number of blocks that were copied to pre-fetch storage. In one or more of the various embodiments, pre-fetch engine may be arranged to track, count, or accumulate the number of blocks that are pre-fetched. For example, in some embodiments, pre-fetch engines may employ a running count that may be stored with the request scores that may be associated the client or the session.

At flowchart block 908, in one or more of the various embodiments, the pre-fetch engine may be arranged to compute the number of blocks that were read from the pre-fetch storage during the request session. In one or more of the various embodiments, pre-fetch engine may be arranged to track the number of blocks that are read from pre-fetch storage during the session. For example, in some embodiments, pre-fetch engines may employ a running count that may be stored with the request scores that may be associated the client or the session.

At flowchart block 910, in one or more of the various embodiments, the pre-fetch engine may be arranged to update the request scores (e.g., score instances) that may be associated with the client associated with the request. In one or more of the various embodiments, the one or more request scores associated with the client that is associated the request session may be updated based on the number of blocks determined to be pre-fetched and the number of pre-fetched blocks that are read during the session.

Further, in one or more of the various embodiments, pre-fetch engines may be arranged to employ additional metrics to incorporate into request scores. For example, in some embodiments, a pre-fetch policy may be configured to compute request scores that may be weighted, scaled, or adjusted based on other factors, such as, client type, application type, requested file/object size, file system object type, system status (e.g., resource utilization, service priorities, or the like).

Next, control may be returned to a calling process.

Figure 10:
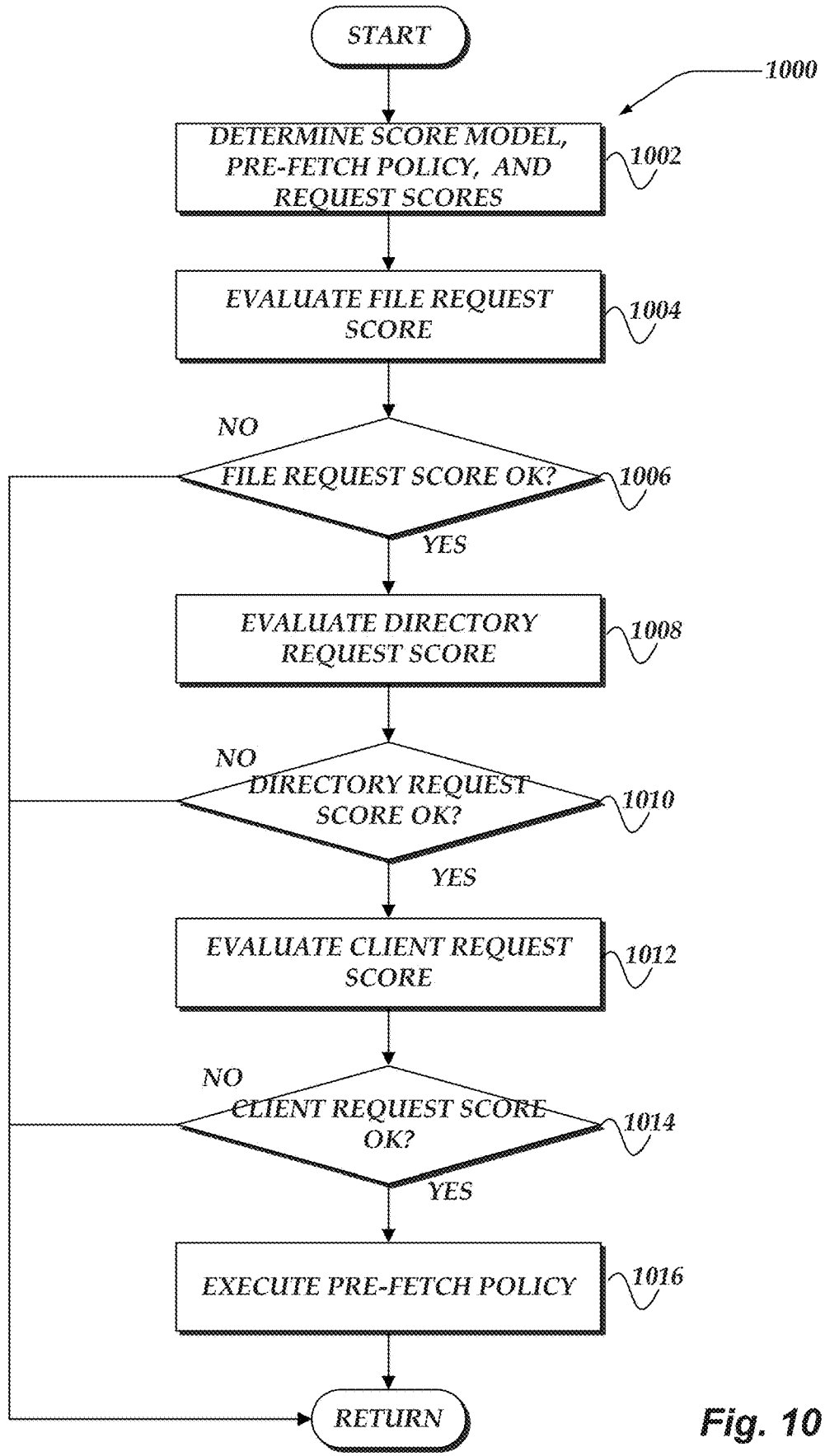
FIG. 10 illustrates a flowchart of a process for executing pre-fetch policies in accordance with one or more of the various embodiments.

FIG. 10 illustrates a flowchart of process 1000 for executing pre-fetch policies in accordance with one or more of the various embodiments. After a start flowchart block, at flowchart block 1002, in one or more of the various embodiments, a pre-fetch engine may be arranged to determine a pre-fetch policy, score model, request scores, or the like, that may be associated with a pending read request. As described above, in some embodiments, the pre-fetch engine may be arranged to associate request score information with the client associated with the request. Accordingly, in some embodiments, the pre-fetch engine may be arranged to retrieve some or all of the request score information based on a client identifier associated with an incoming read request as described above.

At flowchart block 1004, in one or more of the various embodiments, the pre-fetch engine may be arranged to evaluate the file request score. In some embodiments, a score model may be arranged to maintain a request score that is associated with a file object. In some embodiments, the file request score may be a score that is associated with a recent request.

In one or more of the various embodiments, the file request score may be computed based on a count of blocks that were pre-fetched compared to the count of pre-fetched blocks that were not subsequently read during the session. Accordingly, in some embodiments, it the count is greater than zero, the pre-fetch policy may be considered to have performed advantageously. In contrast, if execution of the pre-fetch policy results in more blocks being pre-fetched than were read from pre-fetch storage, the score will be less than zero because the number of pre-fetched blocks exceed the number of blocks that were read from pre-fetch storage over the session.

At decision block 1006, in one or more of the various embodiments, if the file request score is acceptable, control may flow to flowchart block 1008; otherwise, control may be returned to a calling process. In some embodiments, an acceptable file request score may be determined if the number of wasted pre-fetches (e.g., blocks pre-fetched but not requested by the client) is less than a threshold value defined by the current score model.

At flowchart block 1008, in one or more of the various embodiments, the pre-fetch engine may be arranged to evaluate the directory request score. In some embodiments, a pre-fetch engine or score model may be arranged to maintain a running score of the number of blocks that are pre-fetched and read from pre-fetch storage for a file system directory. Accordingly, in one or more of the various embodiments, the pre-fetch engine may be arranged to track the number of blocks pre-fetched on behalf of the client for objects that are in same directory of the file system. In some embodiments, the directory request score may be an aggregate value that corresponds to one or more requests provided by the same client. Accordingly, in some embodiments, the directory score may be generated based on summing each file request score generated for the client.

At decision block 1010, in one or more of the various embodiments, if the directory request score is acceptable, control may flow to flowchart block 1012; otherwise, control may be returned to a calling process. In some embodiments, the score may be determined to be acceptable based on the score rules associated with the score model that was employed to selected the pre-fetch policy. For example, if the number of unread pre-fetched blocks is less than a defined threshold, the pre-fetch engine may consider the score acceptable and continue evaluating the remaining score rules.

At flowchart block 1012, in one or more of the various embodiments, the pre-fetch engine may be arranged to evaluate a client request score. Lastly, in this example, a request score associated with the client itself may be evaluated. Accordingly, in some embodiments, the pre-fetch engine may be arranged to maintain a running score that based on the number of blocks pre-fetched for the client and the number of block read from pre-fetch storage for the client.

At decision block 1014, in one or more of the various embodiments, if the client request score is acceptable, control may flow to flowchart block 1016; otherwise, control may be returned to a calling process. In some embodiments, the client request score may be considered acceptable if the number unread pre-fetched blocks is less than a defined threshold value.

At flowchart block 1016, in one or more of the various embodiments, the pre-fetch engine may be arranged to select or execute the pre-fetch policy. As described above, the evaluation of the score model and an associated score model instance may determine which pre-fetch policy may be selected for execution. In this example, process 1000 executes the determined pre-fetch policy if and only if all of the score rules evaluate to an affirmative results. A single negative result determined at flowchart block 1004, flowchart block 1008, or flowchart block 1012 may prevent the pre-fetch engine from pre-fetching blocks for the pending request.

Next, control may be returned to a calling process.

It will be understood that each flowchart block of the flowchart illustrations, and combinations of flowchart blocks in the flowchart illustrations, can be implemented by computer program instructions. These program instructions may be provided to a processor to produce a machine, such that the instructions, which execute on the processor, create means for implementing the actions specified in the flowchart block or flowchart blocks. The computer program instructions may be executed by a processor to cause a series of operational steps to be performed by the processor to produce a computer-implemented process such that the instructions, which execute on the processor to provide steps for implementing the actions specified in the flowchart block or flowchart blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more flowchart blocks or combinations of flowchart blocks in the flowchart illustration may also be performed concurrently with other flowchart blocks or combinations of flowchart blocks, or even in a different sequence than illustrated without departing from the scope or spirit of the invention.

Accordingly, flowchart blocks of the flowchart illustration support combinations of means for performing the specified actions, combinations of steps for performing the specified actions and program instruction means for performing the specified actions. It will also be understood that each flowchart block of the flowchart illustration, and combinations of flowchart blocks in the flowchart illustration, can be implemented by special purpose hardware based systems, which perform the specified actions or steps, or combinations of special purpose hardware and computer instructions.

The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
    instantiating a pre-fetch engine to perform actions including:
        receiving one or more requests from a client of the file system, wherein the file system includes a pre-fetch storage tier and a file storage tier of one or more storage devices;
        determining a pre-fetch policy based on the one or more requests, one or more directory request scores, one or more file request scores, one or more client request scores, and a score model, wherein the pre-fetch policy determines one or more blocks on the file storage tier to copy to the pre-fetch storage tier, and wherein the score model includes two or more score rules, wherein one of the two or more score rules is associated with a client score;
        determining one or more scores associated with the two or more score rules, wherein the one or more scores are based on one or more previous requests made by the client;
        in response to at least one of the one or more scores exceeds a threshold value, copying the one or more blocks to the pre-fetch storage tier based on the pre-fetch policy;
        updating the one or more scores based on a performance of the pre-fetch policy, wherein the one or more scores are increased based on a number of pre-fetched blocks that are requested by the client, and wherein the one or more scores are reduced based on the number of pre-fetched blocks that remain unrequested by the client; and
        providing a score model instance that references one or more score models that are associated with the two or more score rules, wherein the score model instance is used to associate the one or more scores with a representation of an effectiveness of the pre-fetching of blocks for the client.

2. The method of claim 1, wherein updating the one or more scores, further comprises:
    determining a file score that corresponds to the number of pre-fetched blocks that are requested by the client minus the number of pre-fetched blocks that remain unrequested by the client;
    determining a directory score that corresponds to a sum of one or more file scores that correspond to files in the directory, wherein the one or more file scores are associated with the client; and
    determining a client score that corresponds based on one or more directory scores that are associated with the client.

3. The method of claim 1, wherein the pre-fetch engine performs further actions, including, discarding a portion of the one or more scores based on criteria included in the pre-fetch policy, wherein the criteria includes one or more of a timeout value, a memory quota, or a maximum number of scores.

4. The method of claim 1, wherein the pre-fetch engine performs further actions, including:
in response to a majority of the one or more scores exceeding a defined threshold, copying the one or more blocks to the pre-fetch storage tier based on the pre-fetch policy.

5. The method of claim 1, wherein determining the pre-fetch policy, further comprises, selecting the pre-fetch policy based on one or more attributes that are associated with the request, wherein the one or more attributes include one or more of client identity, client type, geographic location of the client, time-of-day, day-of-week, an application associated with the client, communication method, or a number of objects requested.

6. The method of claim 1, wherein determining one or more scores, further comprises, selecting the one or more scores based on information included in the request, wherein the information includes one or more of a network identity of the client, a user identity associated with the client, or a group identity associated with the client.

7. The method of claim 1, wherein the two or more score rules are associated with configuration information that is executed by the pre-fetch engine to compute the one or more scores.

8. A network computer for managing data in a file system, comprising:
a transceiver that communicates over the network;
a memory that stores at least instructions; and
one or more processors that execute instructions that perform actions, including:
instantiating a pre-fetch engine to perform actions including:
receiving one or more requests from a client of the file system, wherein the file system includes a pre-fetch storage tier and a file storage tier of one or more storage devices;
determining a pre-fetch policy based on the one or more requests, one or more directory request scores, one or more file request scores, one or more client request scores, and a score model, wherein the pre-fetch policy determines one or more blocks on the file storage tier to copy to the pre-fetch storage tier, and wherein the score model includes two or more score rules, wherein one of the two or more score rules is associated with a client score;
determining one or more scores associated with the two or more score rules, wherein the one or more scores are based on one or more previous requests made by the client;
in response to at least one of the one or more scores exceeds a threshold value, copying the one or more blocks to the pre-fetch storage tier based on the pre-fetch policy;
updating the one or more scores based on a performance of the pre-fetch policy, wherein the one or more scores are increased based on a number of pre-fetched blocks that are requested by the client, and wherein the one or more scores are reduced based on the number of pre-fetched blocks that remain unrequested by the client; and
providing a score model instance that references one or more score models that are associated with the two or more score rules, wherein the score model instance is used to associate the one or more scores with a representation of an effectiveness of the pre-fetching of blocks for the client.

9. The network computer of claim 8, wherein updating the one or more scores, further comprises:
determining a file score that corresponds to the number of pre-fetched blocks that are requested by the client minus the number of pre-fetched blocks that remain unrequested by the client;
determining a directory score that corresponds to a sum of one or more file scores that correspond to files in the directory, wherein the one or more file scores are associated with the client; and
determining a client score that corresponds based on one or more directory scores that are associated with the client.

10. The network computer of claim 8, wherein the pre-fetch engine performs further actions, including, discarding a portion of the one or more scores based on criteria included in the pre-fetch policy, wherein the criteria includes one or more of a timeout value, a memory quota, or a maximum number of scores.

11. The network computer of claim 8, wherein the pre-fetch engine performs further actions, including:
in response to a majority of the one or more scores exceeding a defined threshold, copying the one or more blocks to the pre-fetch storage tier based on the pre-fetch policy.

12. The network computer of claim 8, wherein determining the pre-fetch policy, further comprises, selecting the pre-fetch policy based on one or more attributes that are associated with the request, wherein the one or more attributes include one or more of client identity, client type, geographic location of the client, time-of-day, day-of-week, an application associated with the client, communication method, or a number of objects requested.

13. The network computer of claim 8, wherein determining one or more scores, further comprises, selecting the one or more scores based on information included in the request, wherein the information includes one or more of a network identity of the client, a user identity associated with the client, or a group identity associated with the client.

14. The network computer of claim 8, wherein the two or more score rules are associated with configuration information that is executed by the pre-fetch engine to compute the one or more scores.

15. A system for managing data in a file system comprising:
a network computer, comprising:
a transceiver that communicates over the network;
a memory that stores at least instructions; and
one or more processors that execute instructions that perform actions, including:
instantiating a pre-fetch engine to perform actions including:
receiving one or more requests from a client of the file system, wherein the file system includes a pre-fetch storage tier and a file storage tier of one or more storage devices;
determining a pre-fetch policy based on the one or more requests, one or more directory request scores, one or more file request scores, one or more client request scores, and a score model, wherein the pre-fetch policy determines one or more blocks on the file storage tier to copy to the pre-fetch storage tier, and wherein the score model includes two or more score rules, wherein one of the two or more score rules is associated with a client score;

determining one or more scores associated with the two or more score rules, wherein the one or more scores are based on one or more previous requests made by the client;

in response to at least one of the one or more scores exceeds a threshold value, copying the one or more blocks to the pre-fetch storage tier based on the pre-fetch policy;

updating the one or more scores based on a performance of the pre-fetch policy, wherein the one or more scores are increased based on a number of pre-fetched blocks that are requested by the client, and wherein the one or more scores are reduced based on the number of pre-fetched blocks that remain unrequested by the client; and providing a score model instance that references one or more score models that are associated with the two or more score rules, wherein the score model instance is used to associate the one or more scores with a representation of an effectiveness of the pre-fetching of blocks for the client; and a client computer, comprising:
a transceiver that communicates over the network;
a memory that stores at least instructions; and
one or more processors that execute instructions that perform actions, including:
providing one or more of the one or more read requests.

16. The system of claim 15, wherein updating the one or more scores, further comprises:
determining a file score that corresponds to the number of pre-fetched blocks that are requested by the client minus the number of pre-fetched blocks that remain unrequested by the client;
determining a directory score that corresponds to a sum of one or more file scores that correspond to files in the directory, wherein the one or more file scores are associated with the client; and
determining a client score that corresponds based on one or more directory scores that are associated with the client.

17. The system of claim 15, wherein the pre-fetch engine performs further actions, including, discarding a portion of the one or more scores based on criteria included in the pre-fetch policy, wherein the criteria includes one or more of a timeout value, a memory quota, or a maximum number of scores.

18. The system of claim 15, wherein the pre-fetch engine performs further actions, including:
in response to a majority of the one or more scores exceeding a defined threshold, copying the one or more blocks to the pre-fetch storage tier based on the pre-fetch policy.

19. The system of claim 15, wherein determining the pre-fetch policy, further comprises, selecting the pre-fetch policy based on one or more attributes that are associated with the request, wherein the one or more attributes include one or more of client identity, client type, geographic location of the client, time-of-day, day-of-week, an application associated with the client, communication method, or a number of objects requested.

20. The system of claim 15, wherein determining one or more scores, further comprises, selecting the one or more scores based on information included in the request, wherein the information includes one or more of a network identity of the client, a user identity associated with the client, or a group identity associated with the client.

21. The system of claim 15, wherein the two or more score rules are associated with configuration information that is executed by the pre-fetch engine to compute the one or more scores.

22. A processor readable non-transitory storage media that includes instructions for managing data in a file system over a network, wherein execution of the instructions by one or more processors on one or more network computers performs actions, comprising:
instantiating a pre-fetch engine to perform actions including:
receiving one or more requests from a client of the file system, wherein the file system includes a pre-fetch storage tier and a file storage tier of one or more storage devices;
determining a pre-fetch policy based on the one or more requests, one or more directory request scores, one or more file request scores, one or more client request scores, and a score model, wherein the pre-fetch policy determines one or more blocks on the file storage tier to copy to the pre-fetch storage tier, and wherein the score model includes two or more score rules, wherein one of the two or more score rules is associated with a client score;
determining one or more scores associated with the two or more score rules, wherein the one or more scores are based on one or more previous requests made by the client;
in response to at least one of the one or more scores exceeds a threshold value, copying the one or more blocks to the pre-fetch storage tier based on the pre-fetch policy;
updating the one or more scores based on a performance of the pre-fetch policy, wherein the one or more scores are increased based on a number of pre-fetched blocks that are requested by the client, and wherein the one or more scores are reduced based on the number of pre-fetched blocks that remain unrequested by the client; and
providing a score model instance that references one or more score models that are associated with the two or more score rules, wherein the score model instance is used to associate the one or more scores with a representation of an effectiveness of the pre-fetching of blocks for the client.

23. The media of claim 22, wherein updating the one or more scores, further comprises:
determining a file score that corresponds to the number of pre-fetched blocks that are requested by the client minus the number of pre-fetched blocks that remain unrequested by the client;
determining a directory score that corresponds to a sum of one or more file scores that correspond to files in the directory, wherein the one or more file scores are associated with the client; and
determining a client score that corresponds based on one or more directory scores that are associated with the client.

24. The media of claim 22, wherein the pre-fetch engine performs further actions, including, discarding a portion of the one or more scores based on criteria included in the pre-fetch policy, wherein the criteria includes one or more of a timeout value, a memory quota, or a maximum number of scores.

25. The media of claim 22, wherein the pre-fetch engine performs further actions, including:
  in response to a majority of the one or more scores exceeding a defined threshold, copying the one or more blocks to the pre-fetch storage tier based on the pre-fetch policy.

26. The media of claim 22, wherein determining the pre-fetch policy, further comprises, selecting the pre-fetch policy based on one or more attributes that are associated with the request, wherein the one or more attributes include one or more of client identity, client type, geographic location of the client, time-of-day, day-of-week, an application associated with the client, communication method, or a number of objects requested.

27. The media of claim 22, wherein determining one or more scores, further comprises, selecting the one or more scores based on information included in the request, wherein the information includes one or more of a network identity of the client, a user identity associated with the client, or a group identity associated with the client.

28. The media of claim 22, wherein the two or more score rules are associated with configuration information that is executed by the pre-fetch engine to compute the one or more scores.

* * * * *